(12) United States Patent
Hisatake

(10) Patent No.: US 8,310,605 B2
(45) Date of Patent: Nov. 13, 2012

(54) LIQUID-CRYSTAL DISPLAY APPARATUS

(75) Inventor: Yuzo Hisatake, Fukaya (JP)

(73) Assignee: Japan Display Central Inc., Fukaya-shi (JP)

( * ) Notice: Subject to any disclaimer, the term of this patent is extended or adjusted under 35 U.S.C. 154(b) by 1310 days.

(21) Appl. No.: 12/030,548

(22) Filed: Feb. 13, 2008

(65) Prior Publication Data

US 2008/0266471 A1    Oct. 30, 2008

(30) Foreign Application Priority Data

Apr. 24, 2007  (JP) ................................. 2007-114380

(51) Int. Cl.
*G02F 1/1335*      (2006.01)
(52) U.S. Cl. ............................... 349/15; 349/144; 349/48
(58) Field of Classification Search ........................ None
See application file for complete search history.

(56) References Cited

U.S. PATENT DOCUMENTS 4,781,438 A * 11/1988 Noguchi .......................... 349/54
5,606,437 A *  2/1997 Mosier .......................... 349/106

FOREIGN PATENT DOCUMENTS

| JP | 8-136909 | 5/1996 |
| JP | 9-43610 | 2/1997 |
| JP | 2001-21892 | 1/2001 |
| JP | 2003-58066 | 2/2003 |
| JP | 2004-62146 | 2/2004 |
| JP | 2005-316211 | 11/2005 |

* cited by examiner

*Primary Examiner* — Thanh-Nhan P Nguyen
(74) *Attorney, Agent, or Firm* — Oblon, Spivak, McClelland, Maier & Neustadt, L.L.P.

(57) ABSTRACT

A liquid crystal display apparatus comprises a first substrate, a second substrate, a liquid crystal layer and a plurality of pixels. The second substrate is arranged opposite to the first substrate with a gap. The liquid crystal layer is held between the first substrate and the second substrate. The pixels are provided between the first substrate and the second substrate. Each pixel has a first pixel part including a switching element and a pixel electrode electrically connected to the switching element, and a second pixel part including a switching element and a pixel electrode electrically connected to the switching element. The first liquid crystal molecules lying on the first pixel part of each pixel are oriented independently of second liquid crystal molecules lying on the second pixel part of the pixel.

5 Claims, 20 Drawing Sheets

| A | B | A | B |
|---|---|---|---|
| B | A | B | A |
| A | B | A | B |
| B | A | B | A |

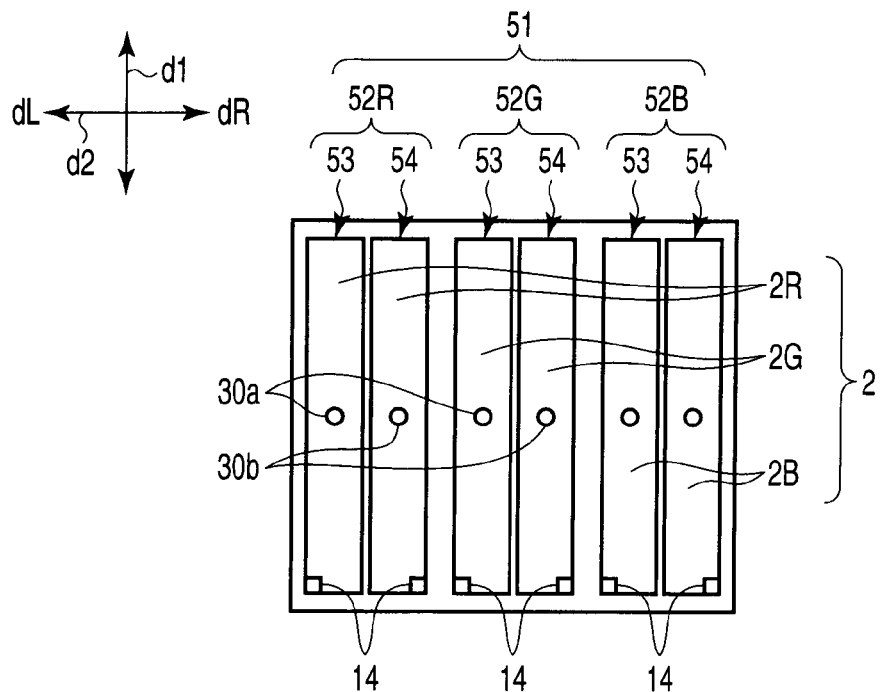
F I G. 5
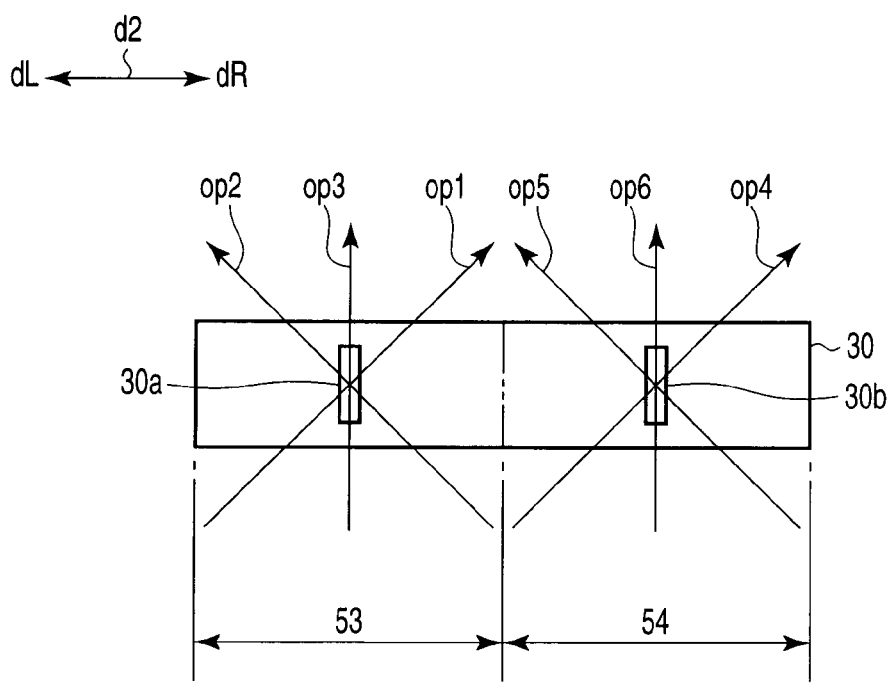
F I G. 6

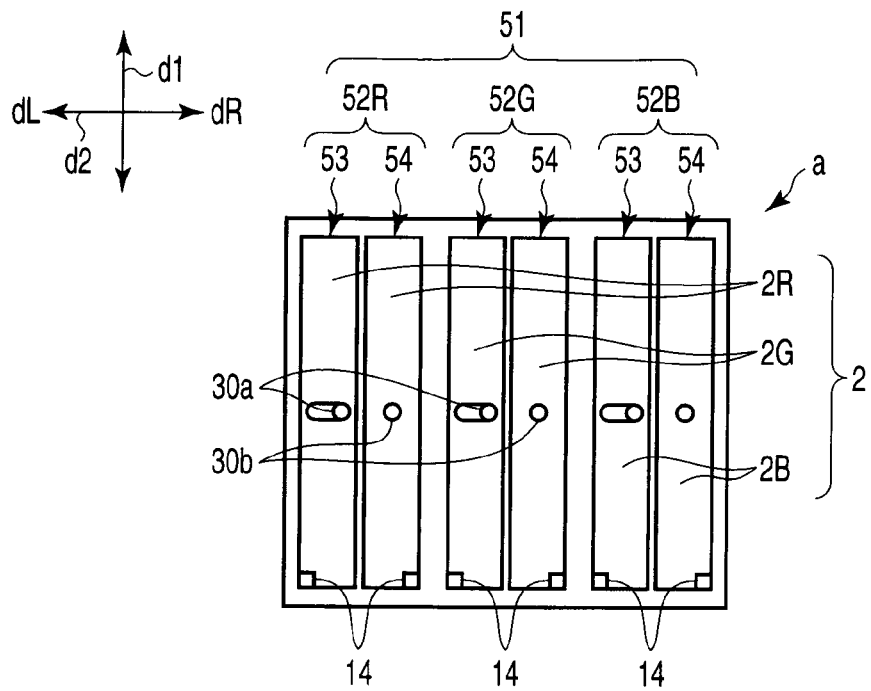
F I G. 7
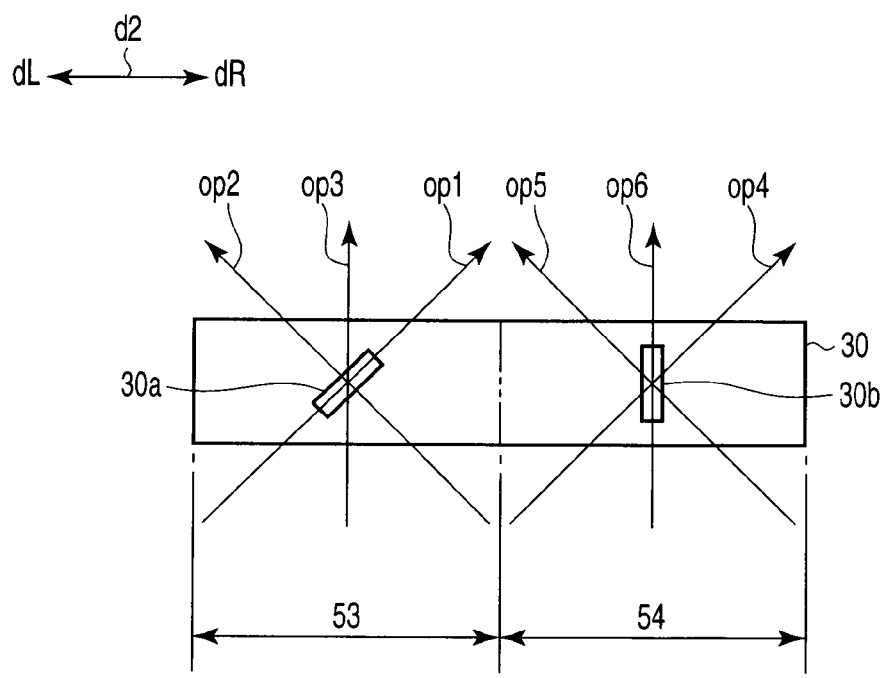
F I G. 8

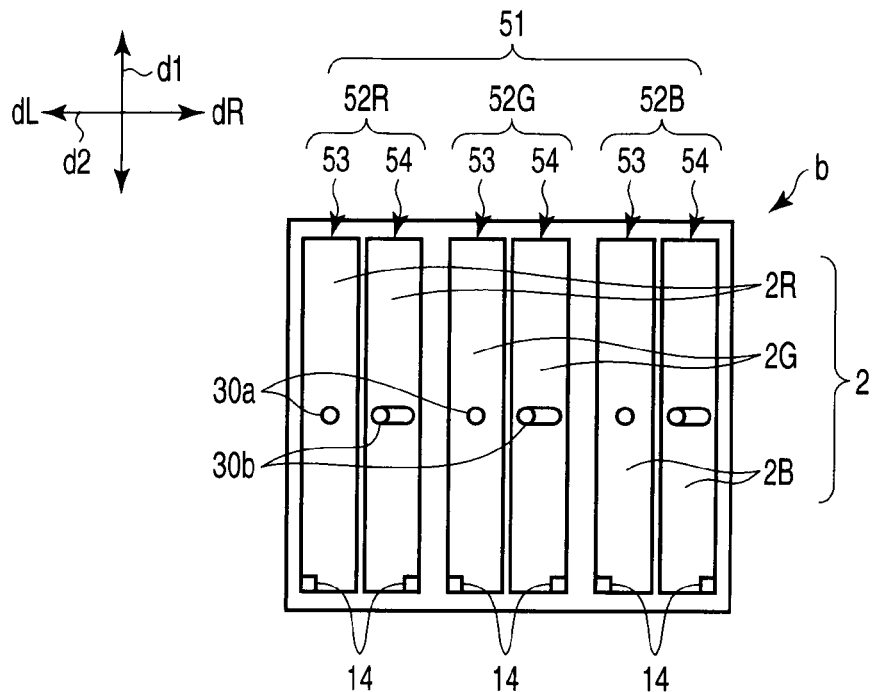
F I G. 9
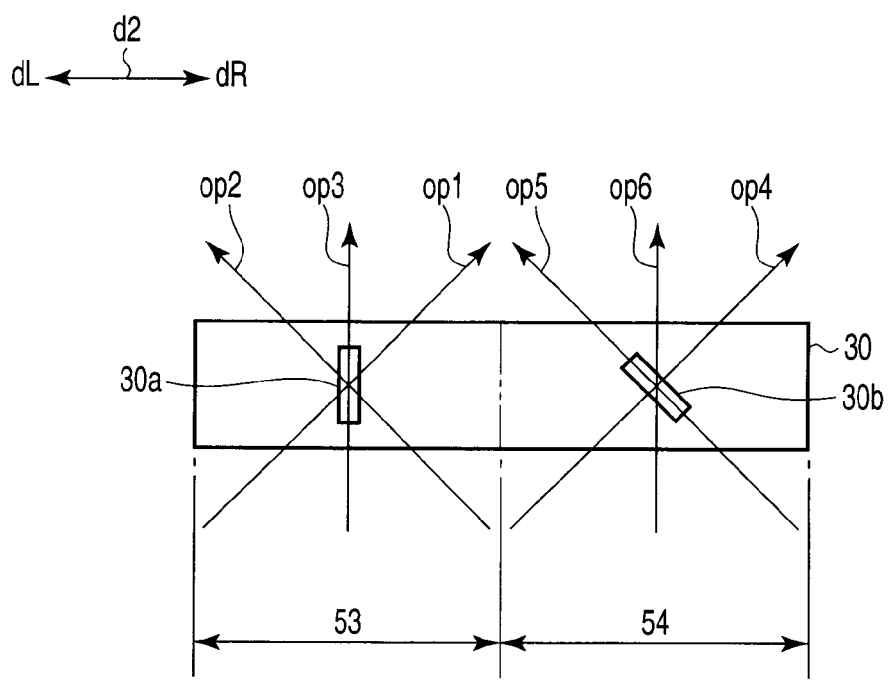
F I G. 10

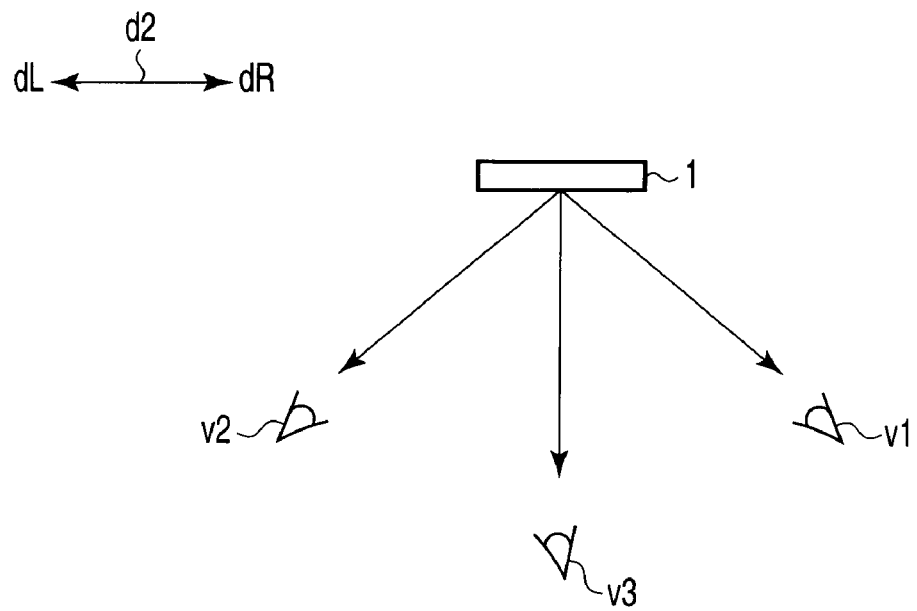
F I G. 1 3
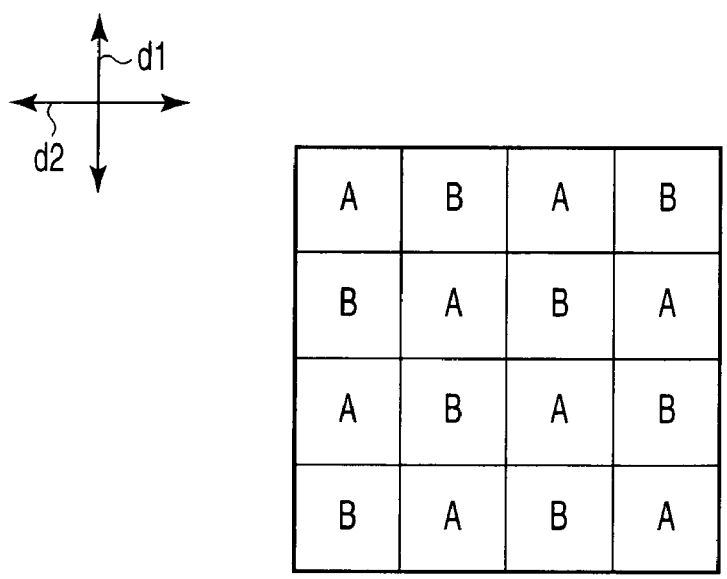
F I G. 1 4

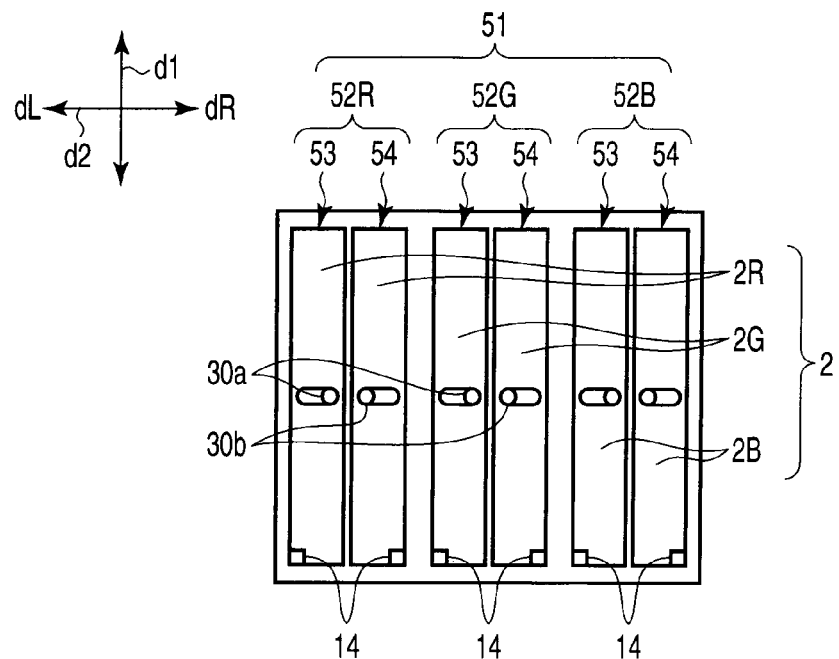
F I G. 21
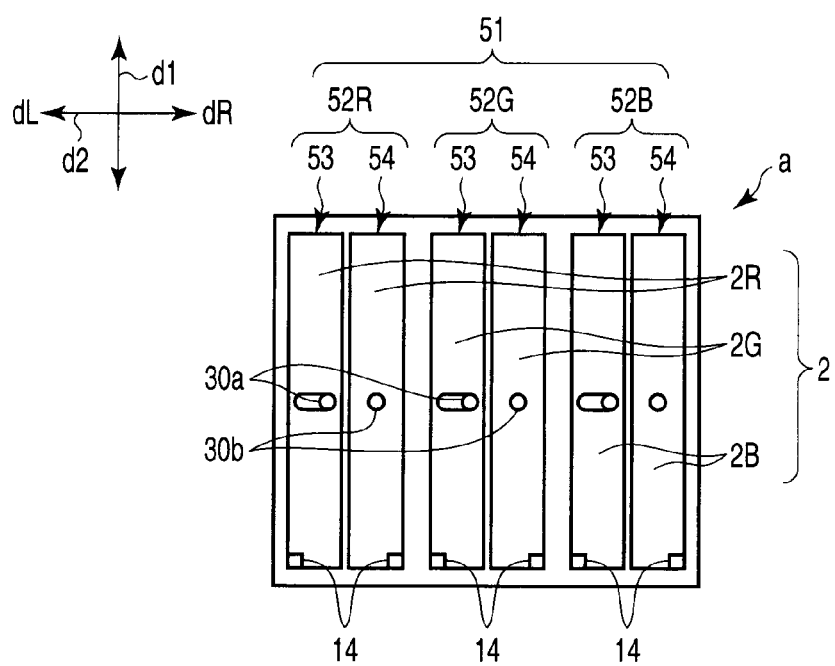
F I G. 22

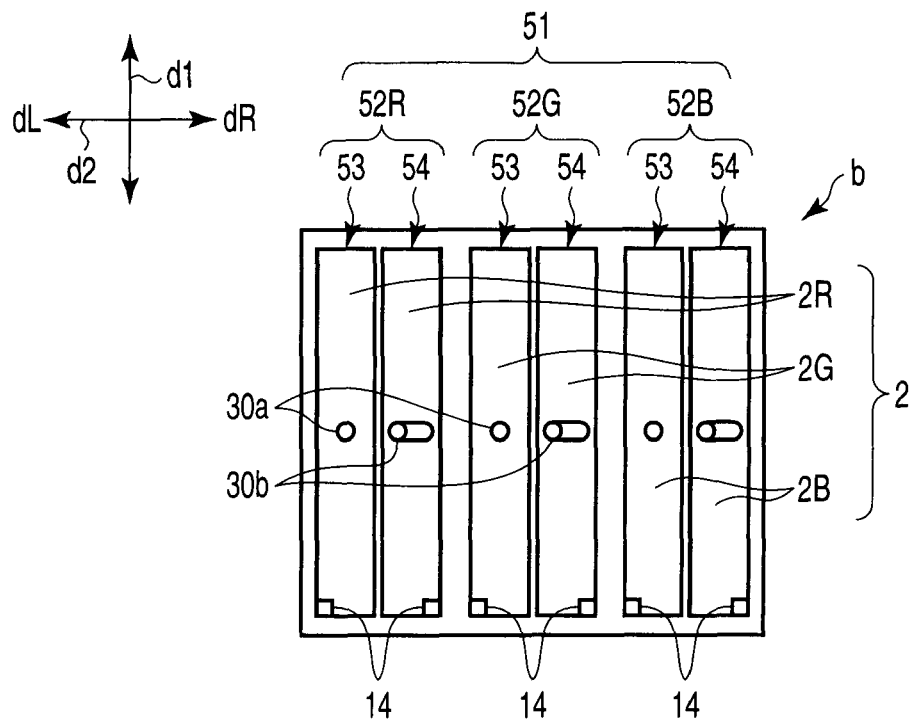
F I G. 23
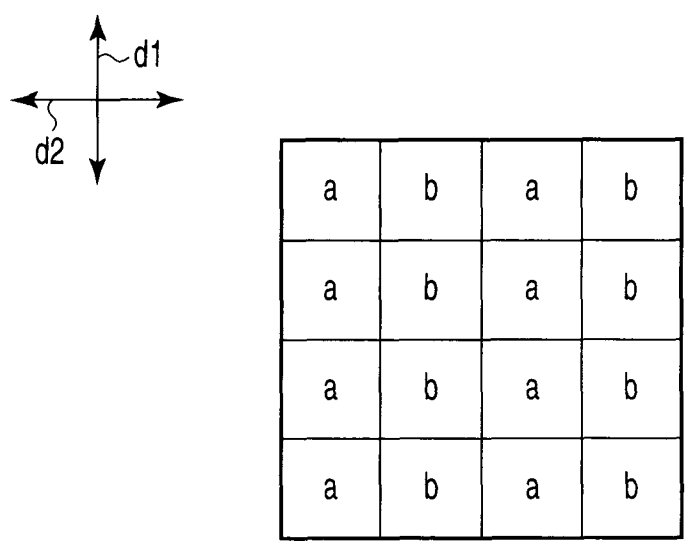
F I G. 24

| | Δn | d (μm) | Δnd (μm) | System 1 | System 2 | System 3 | System 4 |
|---|---|---|---|---|---|---|---|
| First embodiment | 0.064 | 3.50 | 223 | Characteristic the first pixel part has for left-45° view field / Characteristic the second pixel part has for right-45° view field | — | — | Characteristic the first pixel part has for the front / Characteristic the second pixel part has for the front |
| Second embodiment | 0.090 | 3.47 | 313 | Characteristic the first pixel part of first pixel has for left-7° view field / Characteristic the second pixel part of second pixel has for right-7° view field | Characteristic the first pixel part of first pixel has for the front / Characteristic the second pixel part of second pixel has for the front | — | — |
| Third embodiment | 0.077 | 3.50 | 271 | Characteristic the first pixel part of first pixel has for left-30° view field / Characteristic the second pixel part of second pixel has for right-30° view field | — | Characteristic the first pixel part of first pixel has for the front / Characteristic the second pixel part of second pixel has for the front | — |

F I G. 27

| | | First embodiment | Fourth embodiment | Comparative example 1 | Comparative example 2 |
|---|---|---|---|---|---|
| Number of signal lines | | 480 | 480 | 240 | 240 |
| Number of scanning lines | | 320 | 320 | 320 | 320 |
| Resolution | In broad viewing-angle display mode | QVGA | QVGA | QVGA | QVGA |
| | In narrow viewing-angle display mode | QVGA | QVGA | QVGA | |
| Relative luminance | In broad viewing-angle display mode | ~100% | ~100% | ~80% | 100% |
| | In narrow viewing-angle display mode | ~50% | 75~100% | ~80% | |
| CR ratio | In broad viewing-angle display mode | 400:1 | 400:1 | 400:1 | 400:1 |
| | In narrow viewing-angle display mode | 200:1 | 300:1~400:1 | 400:1 | |
| Left and right viewing angles (CR>10, no mosaic) | In broad viewing-angle display mode | 170° | 170° | 170° | 170° |
| | In narrow viewing-angle display mode | 30° | 30° | 45° | |
| Mosaic pitch | | Variable | Variable | Fixed | — |
| Semi-transmissive type | | Usable | Usable | Usable | DATUM |
| Increase in process steps | | None | None | None | DATUM |
| Increase in thickness | | ±0 | +0.2mm | +0.55mm | DATUM |
| Increase in components | | None | First polarizing reflector | Mosaic cells and polarizing plate | DATUM |

F I G. 3 2

LIQUID-CRYSTAL DISPLAY APPARATUS

CROSS-REFERENCE TO RELATED APPLICATIONS

This application is based upon and claims the benefit of priority from prior Japanese Patent Application No. 2007-114380, filed Apr. 24, 2007, the entire contents of which are incorporated herein by reference.

BACKGROUND OF THE INVENTION

1. Field of the Invention

The present invention relates to a liquid-crystal display apparatus.

2. Description of the Related Art

In recent years, liquid crystal displays, which incorporate a liquid-crystal display panel, have been used as display apparatuses. Liquid crystal displays have found use in various electronic apparatuses, particularly in electronic pocket diaries, personal digital assistants (PDAs), cellular telephones, tablet personal computers (PCs), and notebook PCs and the like, which are light, thin and small and are hence portable.

In some cases, the information displayed on an electronic apparatus should not be accessible by any person other than the user of the apparatus. This situation takes place when, for example, a cellular telephone, a PDA or a tablet PC displays private information while the apparatus is being used in public. In view of this, the smaller the viewing angle, the better. It may also be desired, however, for the apparatus to have the function of controlling the viewing angle, because not only the user but also other persons may need to observe the image displayed on the apparatus. This question about the viewing angle is common to both portable apparatuses and public information terminals.

As disclosed in, for example, Jpn. Pat. Appln. No. 2003-58066, detachable louver sheets have recently come into use as a means for controlling the view angle of the liquid crystal display or the cathode-ray tube (CRT). Further, a system has been put to practical use in which the liquid crystal display used has no polarizing plates on the viewer side of a liquid crystal display. The user can observe the information only if he or she wears polarizing glasses.

The conventional louver sheet has a light-shielding layer, which is several millimeters wide in the normal direction of the sheet, in order to reduce the viewing angle sufficiently. Inevitably, the method using a louver sheet is disadvantageous since the louver sheet has low light transmittance. In addition, the method of manufacturing the louver sheet is complicated, which means the manufacturing cost of the louver sheet is high. Further, it takes much time to attach or detach the louver sheet. On the other hand, the method of using polarizing glasses is disadvantageous since the image cannot be seen by people without polarizing glasses. To solve the problem of lack of control over viewing-angle, a liquid crystal display with a viewing-angle controlling liquid-crystal panel was developed.

If a liquid crystal display has a viewing-angle controlling liquid crystal panel, however, the thickness and weight of the liquid crystal display will increase. Moreover, the use of the viewing-angle controlling liquid crystal panel will raise the manufacturing cost of the liquid crystal display, which will increase the price of the liquid crystal display.

BRIEF SUMMARY OF THE INVENTION

The present invention has been made in consideration of the foregoing. An object of this invention is to provide a liquid crystal display apparatus that can be controlled in terms of display characteristics, can have a simple configuration and can be provided at a low price.

To achieve the object, according to an aspect of the present invention, there is provided a liquid crystal display apparatus comprising:

a first substrate;

a second substrate arranged opposite to the first substrate with a gap;

a liquid crystal layer held between the first substrate and the second substrate; and a plurality of pixels provided between the first substrate and the second substrate, wherein each pixel has a first pixel part including a switching element and a pixel electrode electrically connected to the switching element, and a second pixel part including a switching element and a pixel electrode electrically connected to the switching element; and first liquid crystal molecules lying on the first pixel part of each pixel are oriented independently of second liquid crystal molecules lying on the second pixel part of the pixel.

According to another aspect of the present invention, there is provided a liquid crystal display apparatus comprising:

a first substrate;

a second substrate arranged opposite to the first substrate with a gap;

a liquid crystal layer held between the first substrate and the second substrate; and a plurality of pixels provided between the first substrate and the second substrate, each comprising a plurality of sub-pixels of different colors and being the smallest display element capable of appearing white, wherein each sub-pixel has a first pixel part including a switching element and a pixel electrode electrically connected to the switching element, and a second pixel part including a switching element and a pixel electrode electrically connected to the switching element; and first liquid crystal molecules lying on the first pixel part of each sub-pixel are oriented independently of second liquid crystal molecules lying on the second pixel part of the sub-pixel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a magnified plan view of one of the pixels shown in FIG. 4, illustrating how the liquid crystal molecules are oriented while the first and second pixel parts are receiving no drive voltage;

FIG. 6 is a diagram illustrating the orientation that the liquid crystal molecules have and the path in which light travels, while the first and second pixel parts are receiving no drive voltage;

FIG. 7 is a magnified plan view of one of the pixels shown in FIG. 4, illustrating how the liquid crystal molecules are oriented while the first pixel parts are receiving a drive voltage and the second pixel parts are receiving no drive voltage;

FIG. 8 is a diagram illustrating, like FIG. 7, the orientation that the liquid crystal molecules have and the path in which light travels, while the first pixel part is receiving a drive voltage and the second pixel part is receiving no drive voltage;

FIG. 9 is a magnified plan view of one of the pixels shown in FIG. 4, illustrating how the liquid crystal molecules are oriented while the first pixel parts are receiving no drive voltage and the second pixel parts are receiving a drive voltage;

FIG. 10 is a diagram illustrating, like FIG. 9, the orientation that the liquid crystal molecules have and the path in which light travels, while the first pixel part is receiving no drive voltage and the second pixel part is receiving a drive voltage;

FIG. 13 is a diagram showing the path in which light travels from the liquid crystal display;

FIG. 14 is a plan view showing the first-pixel groups and second-pixel groups provided in the liquid crystal display, which are arranged in a checkerboard pattern;

FIG. 21 is, like FIGS. 17 and 18, a magnified plan view of one of the pixels provided in the liquid crystal display according to the second embodiment of the invention, illustrating how the liquid crystal molecules are oriented while the first and second pixel parts are receiving a drive voltage;

FIG. 22 is a magnified plan view of one of the pixels provided in a liquid crystal display according to a third embodiment of the invention, illustrating how the liquid crystal molecules are oriented while the first pixel parts are receiving a drive voltage and the second pixel parts are receiving no drive voltage;

FIG. 23 is, like FIG. 22, a magnified plan view of one of the pixels provided in the liquid crystal display according to the third embodiment of the invention, illustrating how the liquid crystal molecules are oriented while the first pixel parts are receiving no drive voltage and second pixel parts are receiving a drive voltage;

FIG. 24 is a plan view showing the first pixels and second pixels shown in FIGS. 22 and 23, which are arranged in a strip pattern;

FIG. 27 is a table showing values Δn, d and Δnd that the liquid crystal displays according to the first to third embodiments have;

FIG. 32 is a table showing the characteristics of the liquid crystal displays according to the first to fourth embodiments and the characteristics of the liquid crystal displays according to Comparative Examples 1 and 2.

DETAILED DESCRIPTION OF THE INVENTION

Figure 1:
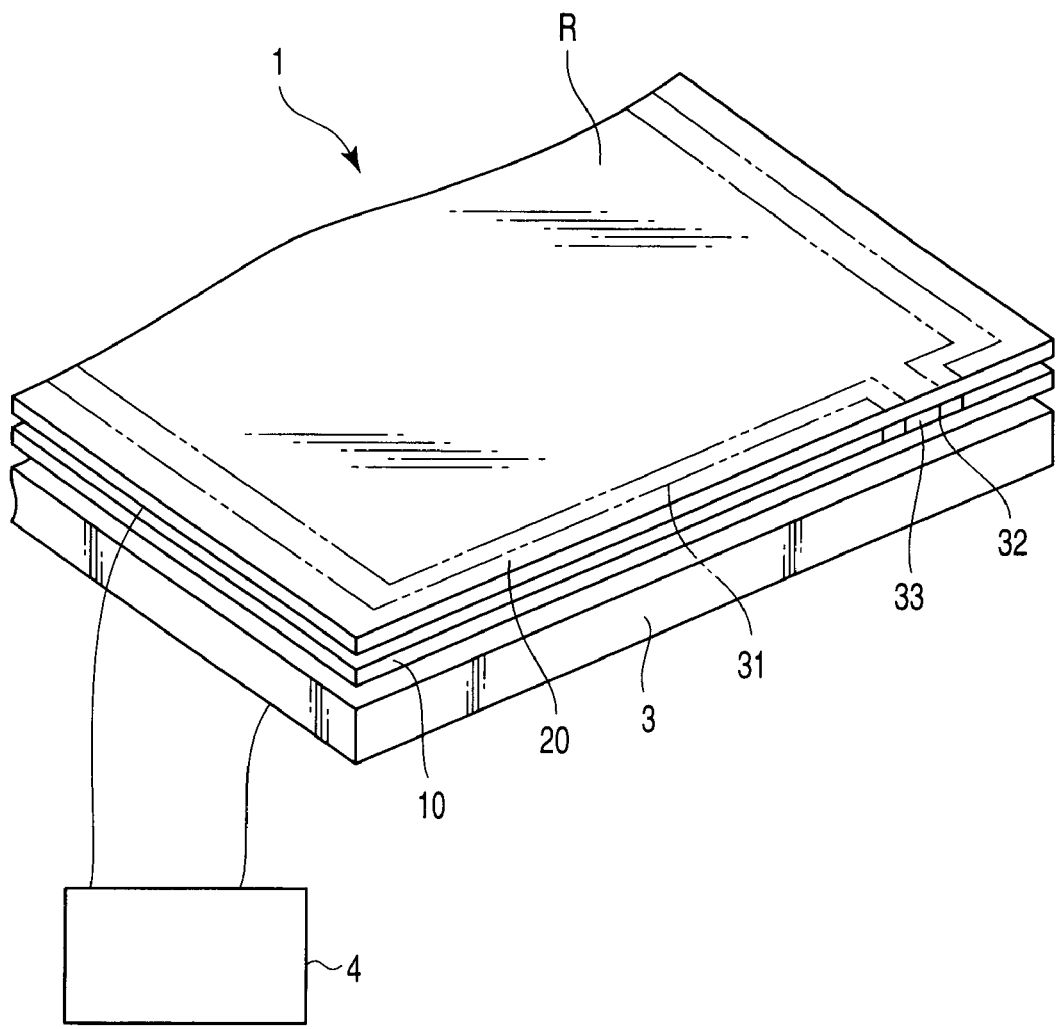
FIG. 1 is a perspective view of a liquid crystal display according to a first embodiment of the present invention.
Figure 2:
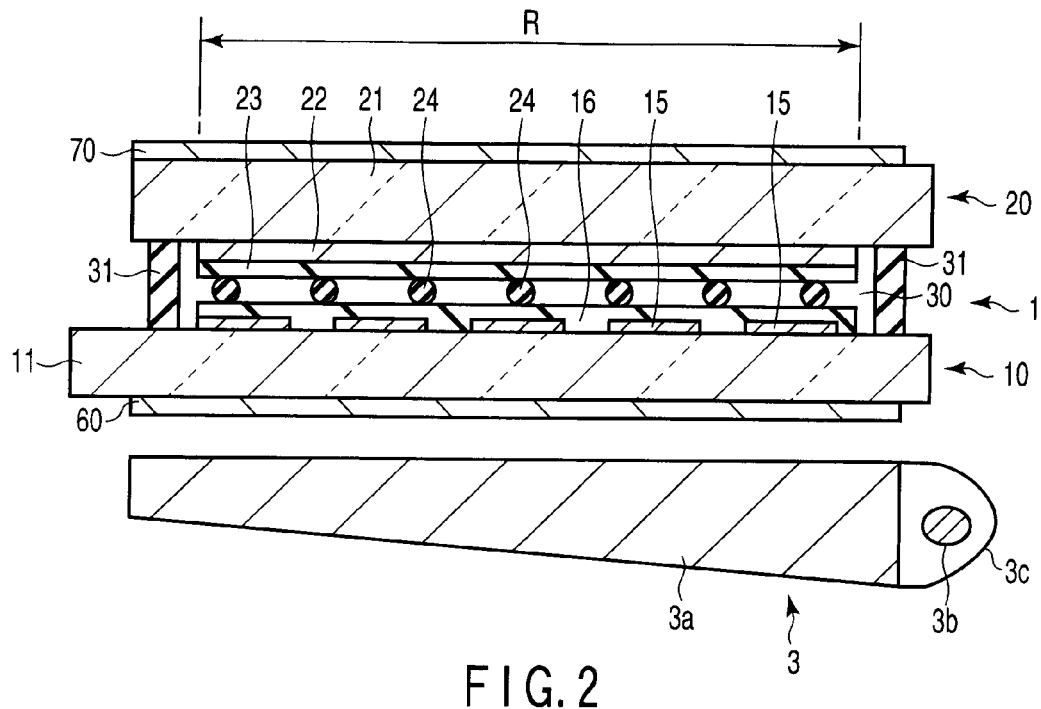
FIG. 2 is a sectional view of the liquid crystal display shown in FIG. 1.
Figure 3:
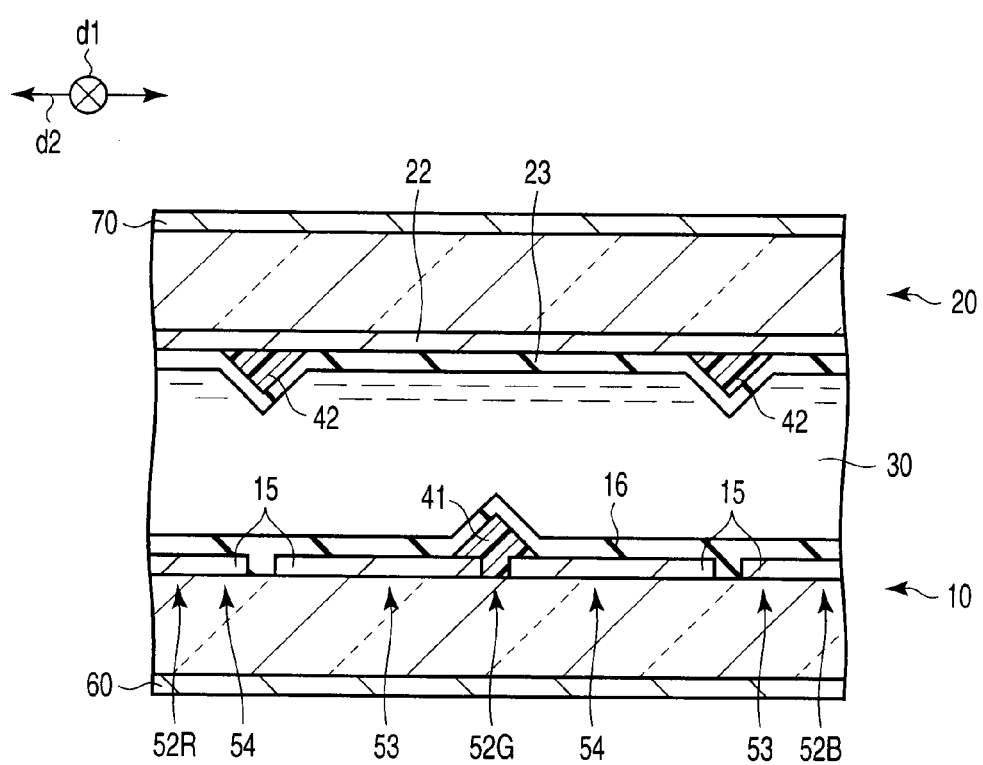
FIG. 3 is a magnified sectional view showing the liquid crystal display panel shown in FIGS. 1 and 2.

A liquid crystal display according to a first embodiment of this invention will be described in detail, with reference to the accompanying drawings.

As FIG. 1, FIG. 2, FIG. 3, FIG. 4 and FIG. 5 show, the liquid crystal display comprises a liquid crystal display panel 1, a color filter 2, a backlight unit 3, and a control unit 4. The liquid crystal display panel 1 has an array substrate 10, a counter substrate 20, a liquid crystal layer 30, an orientation control unit 40, a plurality of pixel groups 50, a first polarizing plate 60, and a second polarizing plate 70. The array substrate 10 and counter substrate 20 have a display region R.

The pixel groups 50 are provided between the display regions R of the array substrate 10 and counter substrate 20. Each pixel group 50 consists of a plurality of pixels 51. The pixels 51 are the smallest display element that can present a white dot. The pixels 51 are arranged in the first and second directions d1 and d2 extending parallel to the array substrate 10 and counter substrate 20 and intersecting with each other at right angles. Thus arranged, the pixels 51 form a matrix pattern.

Each of the pixels 51 has three sub-pixels, 52R, 52G and 52B of different colors. In the present embodiment, the sub-pixels 52R, 52G and 52B are arranged in the second direction d2. The sub-pixels 52R, 52G and 52B have first and second pixel parts 53 and 54 each. The first pixel part 53 and second pixel part 54 of each sub-pixel are of the same color. In the present embodiment, the first and second pixel parts 53 and 54 of each sub-pixel are arranged in the second direction d2. The array substrate 10 according to this embodiment, which is a QVGA array substrate as seen from FIGS. 3 and 4, will be described below.

Figure 4:
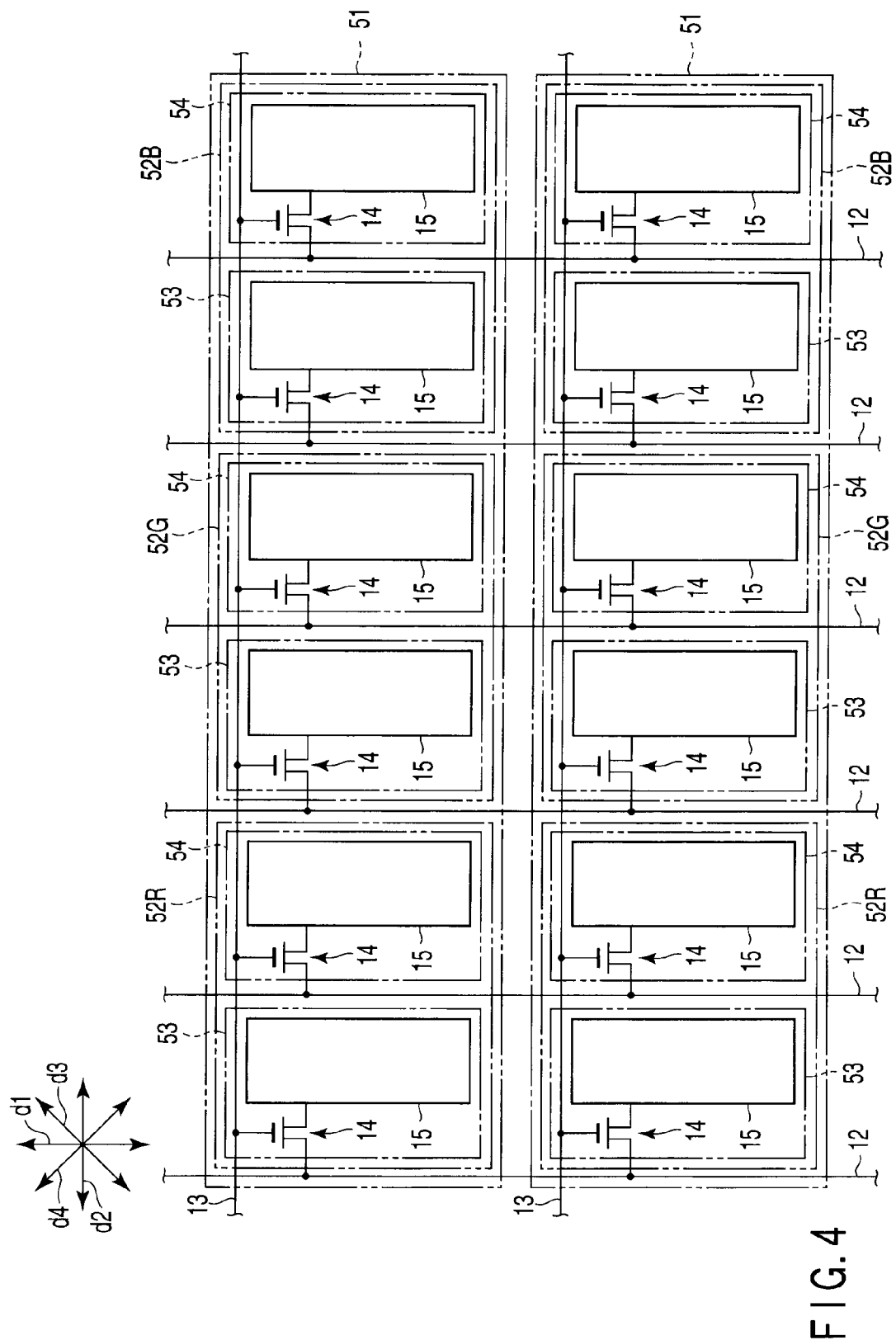
FIG. 4 is a schematic plan view of the array substrate shown in FIGS. 1 to 3, particularly showing the pixels provided on the substrate.

The array substrate 10 is a transparent insulating substrate and has a glass substrate 11, which is the first substrate. On the display region R of the glass substrate 11, a plurality of signal lines 12 and a plurality of scanning lines 13 are provided, forming a matrix pattern. More precisely, the signal lines 12 extend in the first direction, d1, and the scanning lines 13 extend in the second direction, d2. As FIG. 4 shows, the present embodiment has 480 signal lines 12 and 320 scanning lines. Any two adjacent signal lines 12 and any two adjacent scanning lines 13 demarcate each pixel part (i.e., first pixel part 53 or second pixel part 54).

Near each of the intersections of the signal lines 12 and the scanning lines 13, a TFT 14, for example, is provided as a switching element. Hence, two TFTs 14 are provided at the first and second pixel parts 53 and 54 of each sub-pixel, respectively.

Each TFT 14 has a gate electrode, a channel layer, a gate-insulating layer, a source electrode and a drain electrode, which are not shown. The gate electrode extends from the scanning line 13. The channel layer is opposed to the gate electrode, across the gate-insulating layer. The source electrode is connected to one region of the channel layer. The drain electrode is connected to the other region of the channel layer. In the present embodiment, the channel layer is made of polysilicon (p-Si). The source electrode is electrically connected to the signal line 12. The drain electrode is electrically connected to a pixel electrode 15, which will be described later.

On the glass substrate 11, a plurality of pixel electrodes 15 are formed and arranged in a matrix pattern. The pixel electrodes 15 are made of a transparent conductive film, such as an ITO (indium tin oxide) film. One pixel electrode 15 is provided on each first pixel part 53. Similarly, one pixel electrode 15 is provided on each second pixel part 54.

On the glass substrate 11, too, a plurality of projections 41 are formed. The projections 41 protrude toward the counter substrate 20 and extend in the first direction, d1. Each projection 41 lies between the first and second pixel parts 53 and 54 of one sub-pixel. An alignment film 16 is formed on almost the entire upper surface of the glass substrate 11, covering the pixel electrodes 15 and the projections 41. In this embodiment, the orientation film 16 is a vertical alignment film.

The counter substrate 20 is arranged opposite to the array substrate 10 and spaced apart therefrom with a predetermined gap. The counter substrate 20 is a transparent insulating substrate and has a glass substrate 21, which is the second substrate. On the glass substrate 21, a counter electrode 22 is formed. The counter electrode 22 is a transparent conductive film made of, for example, ITO.

On the counter electrode 22, a plurality of projections 42 are formed. The projections 42 protrude toward the array substrate 10 and extend in a first direction d1. Each projection 42 lies between a sub-pixel 52R and a sub-pixel 52G or between a sub-pixel 52G and a sub-pixel 52B. The projections 41 and the projections 42 constitute an orientation control unit 40. An alignment film 23 is formed, covering the glass substrate 21, counter electrode 22 and projections 42. The orientation film 23 is a vertical alignment film. The counter substrate 20 has a display surface S, which faces away from the array substrate 10.

The array substrate 10 and the counter substrate 20 are arranged opposite to each other with a predetermined gap therebetween by, for example, a plurality of spherical spacers 24. The spacers 24 are not limited to spherical ones, nevertheless. They may be, for example, pillar-shaped spacers. The array substrate 10 and the counter substrate 20 are joined to each other with a sealing member 31 that is arranged on the edge parts of the substrates 10 and 20.

The liquid crystal layer 30 is held between the array substrate 10 and the counter substrate 20. The liquid crystal layer 30 is made of a nematic liquid crystal. As shown in FIG. 27, the liquid crystal layer 30 has a Δn value of 0.064, gap d of 3.50 μm, and Δnd value of 223 nm. The sealing member 31 has a liquid crystal intake 32, which is closed with a sealant 33.

So configured as described above, the liquid crystal display panel 1 can operate in an orientation-divided, vertically aligned mode.

The first polarizing plate 60 is arranged opposite to the array substrate 10. The first polarizing plate 60 has an absorption axis that is parallel to a line that extends along the plane of the array substrate 10 and that of the counter substrate 20. In the present embodiment, the absorption axis of the first polarizing plate 60 is parallel to the third direction d3 inclined at 45° to the first direction d1 and second direction d2.

The second polarizing plate 70 is arranged opposite to the counter substrate 20. Therefore, the second polarizing plate 70 has a display surface S1 in the present embodiment. The second polarizing plate 70 has an absorption axis that intersects at right angles with the absorption axis of the first polarizing plate 60. The absorption axis is parallel to a line that extends along the plane of the array substrate 10 and that of the counter substrate 20. In the present embodiment, the absorption axis of the second polarizing plate 70 is parallel to the fourth direction d4 that intersect at right angles with the third direction d3.

The color filter 2 is provided on the counter substrate 20 of the liquid crystal display panel 1. The color filter 2 has a plurality of color layers of different colors, which are laid one on another in the display region R of the counter substrate 20. In the present embodiment, the color filter 2 has red layers 2R, green layers 2G, and blue layers 2B. The color layers 2R, 2G and 2B are shaped in strips, each extending in the first direction d1, in the present embodiment.

The sub-pixels 52R, 52G and 52B of each pixel 51 have color layers each, which differ in color from those of any other sub-pixel. More precisely, the sub-pixel 52R has red layers 2R, the sub-pixel 52G has green layers 2G, and sub-pixel 52B has blue layers 2B. Thus, the color layers provided at the first and second pixel parts 53 and 54 of each sub-pixel (52R, 52G or 52B) are of the same color.

The color filter 2 has a light-shielding unit (not shown) shaped like a rectangular frame and provided outside the display region R, in addition to the color layers 2R, 2G and 2B. The light-shielding unit surrounds the color layers 2R, color layers 2G and color layers 2B. The light-shielding unit serves to shield light leaking from the display region R.

The backlight unit 3 is arranged to face the array substrate 20 across the first polarizing plate 60. The backlight unit 3 comprises a light-guiding body 3a, a light source 3b, and a reflecting plate 3c. The light-guiding body 3a is opposed to the first polarizing plate 60. The light source 3b and the reflecting plate 3c are arranged opposite to one end of the light-guiding body 3a. The backlight unit 3 emits light to the first polarizing plate 60. In the present embodiment, the light emitted from the backlight unit 3 is diffused.

The control unit 4 is electrically connected to the liquid crystal display panel 1 and backlight unit 3. The control unit 4 applies a drive voltage to the liquid crystal display panel 1 and backlight unit 3. In order to drive the liquid crystal display panel 1, the control unit 4 applies the drive voltage to the signal lines 12 and scanning lines 13, ultimately to the TFTs 14.

The control unit 4 adjusts the drive voltage, thereby independently driving the first and second pixel parts 53 and 54 of each sub-pixel. Therefore, of the liquid crystal molecules of each pixel 51, the first liquid crystal molecules 30a lying on the first pixel part 53 are oriented in one way, and the second liquid crystal molecules 30b lying on the second pixel part 54 are oriented in another way. The control unit 4 thus controls the orientation of the first liquid crystal molecules 30a and that of the second liquid crystal molecules 30b.

It will be explained what characteristics the liquid crystal molecules exhibit and how light behaves in the molecules when the first and second pixel parts 53 and 54 of each sub-pixel are driven independently of each other.

First, assume that the drive voltage is applied to neither the first pixel parts 53 nor the second pixel parts 54. As shown in FIGS. 5 and 6, the first liquid crystal molecules 30a and the second liquid crystal molecules 30b are oriented in substantially the same direction. More precisely, the first and second liquid crystal molecules 30a and 30b are oriented in a direction parallel to the normal to the array substrate 10 and counter substrate 20.

In each first pixel part 53, light may travel in a path op1 in direction dR, in a path op2 in direction dL, or in a path op3 along the normal to the display screen. In each second pixel part 54, light may travel in a path op4 in direction dR, in a path op5 in direction dL, or in a path op6 along the normal to the display screen.

Consider that the light beams passing in the paths op1, op2, op3, op4, op5 and op6 have phase differences R1, R2, R3, R4, R5 and R6, respectively. Then, R1=R2=R4=R5≈0, and R3=R6=0. Hence, the first pixel parts 53 and the second pixel parts 54 appear almost black in the direction dR and the direction dL. As a result, the display screen appears black if viewed from the front.

Thus, the control unit 4 applies no drive voltage to the first and second pixel parts 53 and 54 of each sub-pixel, orienting the first liquid crystal molecules 30a and second liquid crystal molecules 30b in one direction, whereby the display screen appears black. The liquid crystal display therefore performs black display. That is, the display screen appears black when viewed from viewpoints v1, v2 and v3 as shown in FIG. 13.

Now, assume that the drive voltage is applied to the first pixel parts 53 and no drive voltage is applied to the second pixel parts 54. FIGS. 7 and 8 show a first pixel a, in which the first liquid crystal molecules 30a in the first pixel parts 53 of the sub-pixels are oriented in one direction, while the second liquid crystal molecules 30b in the second pixel parts 54 are orientated in another direction. That is, the first liquid crystal molecules 30a are oriented in a direction inclined from the normal to the display screen, while the second liquid crystal molecules 30b are oriented along the normal to the display screen. More specifically, the first liquid crystal molecules 30a tilt to the right, or in the direction dR.

In this case, R1=R6=0, R2=λ/2, R3≠0, and R4=R5≈0. Note that Δnd has been so adjusted that R2=λ/2. As a result, the first pixel part 53 appears black as viewed in a direction (hereinafter referred to as rightward direction dR) inclined from the normal to the display screen, and the second pixel part 54 appears black as viewed from the front (or along normal to the display screen). Further, the first pixel part 53 appears white as viewed in a direction (hereinafter referred to as leftward direction dL) inclined in direction dL from the normal to the display screen. The first pixel part 53 appears either white or gray as viewed from the front of the display screen, and the second pixel part 54 appears almost black as viewed in the rightward direction dR and also in the leftward direction dL. This means that each sub-pixel can appear white as viewed in the leftward direction dL and can appear white or gray as viewed from the front of the display screen. Needless to say, the color that each sub-pixel presents changes in accordance with the image displayed on the screen.

That is, the control unit 4 applies a drive voltage to the first pixel part 53 and applies no drive voltage to the second pixel part 54. As a result, the first liquid crystal molecules 30a are oriented in a direction inclined from the normal to the plane of the array substrate 10, and the second liquid crystal molecules 30b remain oriented in one direction (along the normal to the plane of the array substrate 10). Thus, the operating mode is switched to a narrow viewing-angle display mode to display an image in the leftward direction dL on the display screen.

Now that the liquid crystal display has been switched to the narrow viewing-angle display mode, it displays a color image in the leftward direction dL on the display screen. The color image can be seen as viewed from the front of the display screen, though its luminance level decreases. That is, as shown in FIG. 13, a color image is seen from at least the viewpoint v2, and a black image is seen at the viewpoint v1.

Assume that no drive voltage is applied to the first pixel parts 53 and the drive voltage is applied to the second pixel parts 54. FIGS. 9 and 10 show a second pixel b, in which the drive voltage is applied to the second pixel part 54 only. The first liquid crystal molecules 30a are oriented in one direction, and the second liquid crystal molecules 30a are orientated in another direction. That is, the first liquid crystal molecules 30a are oriented in a direction along the normal to the above-mentioned plane, while the second liquid crystal molecules 30b are oriented in a direction inclined from the normal to the display screen. More specifically, the second liquid crystal molecules 30b tilt in the leftward direction dL.

In this case, R1=R2≈0, R3=R5=0, R4=λ/2, and R6≈0. Note that Δnd has been so adjusted that R4=λ/2. As a result, the first pixel part 53 appears black as viewed from the front of the display screen, and the second pixel part 54 appears black as viewed in the leftward direction dL. Further, the first pixel part 53 appears almost black as viewed in the rightward direction dR and leftward direction dL on the display screen. The second pixel part 54 appears white as viewed from in the rightward direction dR on the display screen. Further, the second pixel part 54 appears either white or gray as viewed from the front of the display screen. Thus, each sub-pixel can appear white as viewed in the rightward direction dR and can appear white or gray as viewed from the front of the display screen. Needless to say, the color that each sub-pixel presents changes in accordance with the image displayed on the screen.

That is, the control unit 4 applies no drive voltage to the first pixel part 53 and a drive voltage to the second pixel part 54. As a result, the first liquid crystal molecules 30a are oriented in one direction (along the normal to the above-mentioned plane), and the second liquid crystal molecules 30b are oriented in a direction inclined from the normal to the above-mentioned plane. Thus, the operating mode is switched to a narrow viewing-angle display mode to display an image in the rightward direction dR on the display screen.

Now that the liquid crystal display has been switched to the narrow viewing-angle display mode, it displays a color image in the rightward direction dR on the display screen. The color image can be seen as viewed from the front of the display screen, though its luminance level decreases. That is, as shown in FIG. 13, a color image is seen from at least the viewpoint v1, and a black image is seen from the viewpoint v2.

Figure 11:
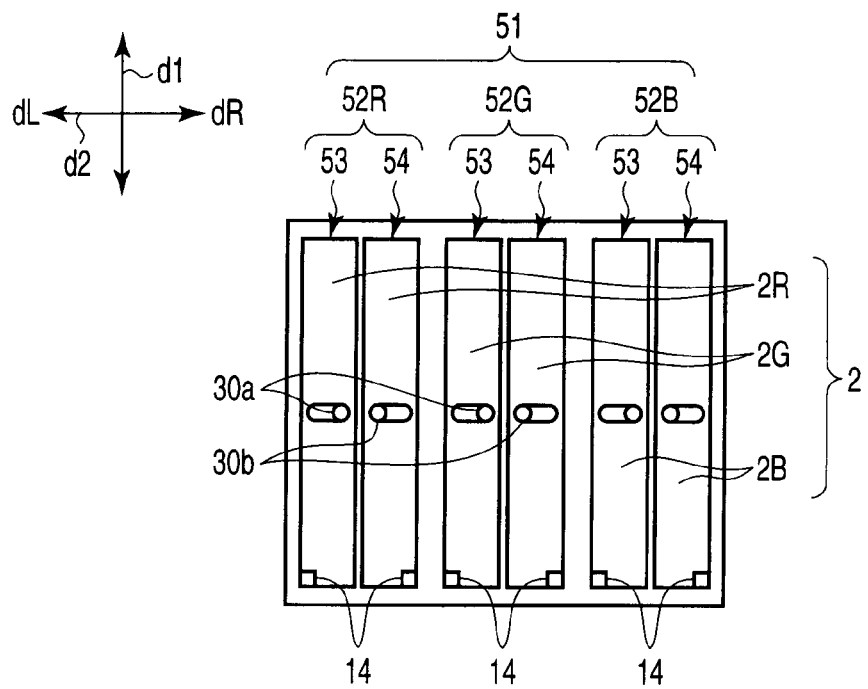
FIG. 11 is a magnified plan view of one of the pixels shown in FIG. 4, illustrating how the liquid crystal molecules are oriented while the first and second pixel parts are receiving a drive voltage.
Figure 12:
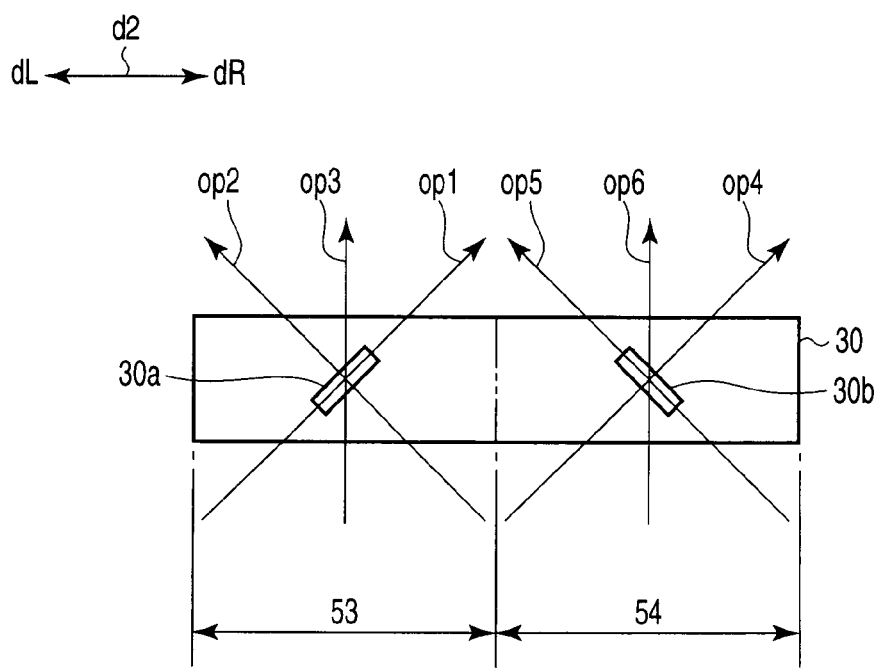
FIG. 12 a diagram illustrating, like FIG. 11, the orientation that the liquid crystal molecules have and the path in which light travels, while the first and second pixel parts are receiving a drive voltage.

Further assume that the drive voltage is applied to both the first pixel parts 53 and the second pixel parts 54. FIGS. 11 and 12 show first liquid crystal molecules 30a oriented in one direction and the second liquid crystal molecules 30b oriented in another direction. That is, the first liquid crystal molecules 30a tilt in one direction to the normal to the above-mentioned plane, while the second liquid crystal molecules 30b tilt in the opposite direction to the normal to the above-mentioned plane. More specifically, the first liquid crystal molecules 30a tilt to the rightward direction dR, and the second liquid crystal molecules 30b tilt to the leftward direction dL.

In this case, R1=R5=0, R2=R4=λ/2, and R3=R6≈0. As a result, the first pixel part 53 appears black as viewed in the rightward direction dR, and the second pixel part 54 appears black as viewed in the leftward direction dL. Further, the first pixel part 53 appears white as viewed in the leftward direction dL, and the second pixel part 54 appears white as viewed in the rightward direction dR. The first and second pixel parts 54 appear white or gray as viewed from the front of the display screen. Thus, each sub-pixel can appear white as viewed from the front of the display screen and can appear gray as viewed in the rightward direction dR and leftward direction dL. Needless to say, the color that each sub-pixel presents changes in accordance with the image the displayed on the screen.

That is, the control unit 4 applies the drive voltage to the first pixel parts 53 and the second pixel parts 54, respectively. As a result, the first liquid crystal molecules 30a tilt in one direction from the normal to the above-mentioned plane, and the second liquid crystal molecules 30b tilt in the opposite direction from the normal to the above-mentioned plane. Thus, the liquid crystal display is switched to a broad viewing-angle display mode to display an image on the display screen.

Now that the liquid crystal display has been switched to the broad viewing-angle display mode, it displays a color image in front of the display screen. The color image can be seen, too, as viewed in the rightward direction dR and the leftward direction dL, though its luminance level decreases. That is, as shown in FIG. 13, a color image is seen at the viewpoints v1, v2 and v3.

The control unit 4 adjusts the drive voltage as described above, whereby the liquid crystal display can display an image in a specific direction only.

It will be explained next how the liquid crystal display displays an image of a checkerboard pattern so that the image information may be recognized only if it is viewed from the front of the display screen.

As shown in FIG. 14, each pixel group 50 consists of first-pixel groups A and second-pixel groups B. The first-group pixels A and the second-group pixels B are arranged in a checkerboard pattern.

Figure 15:
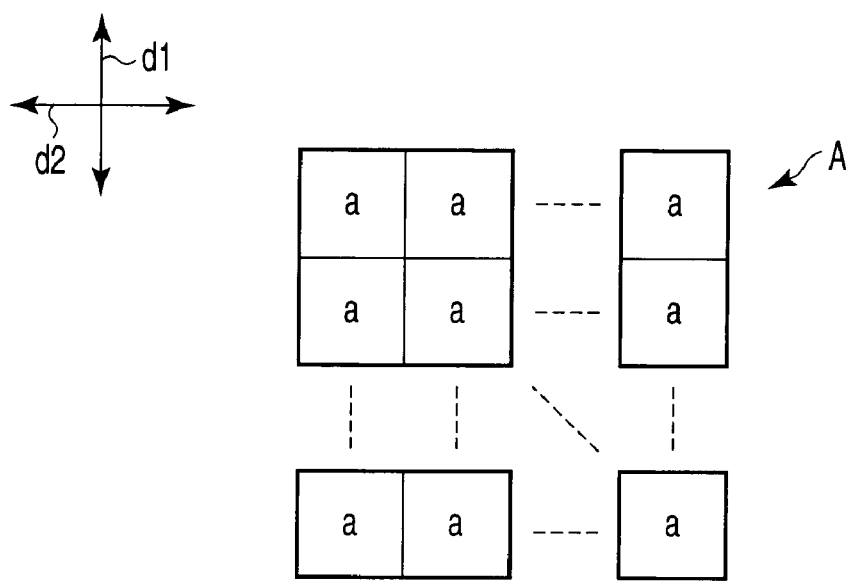
FIG. 15 is a plan view showing one of the first-pixel groups.

As FIG. 15 shows, each first-pixel group A has a plurality of first pixels a of the type shown in FIGS. 7 and 8. The first pixels a are arranged such that each is adjacent to another.

Figure 16:
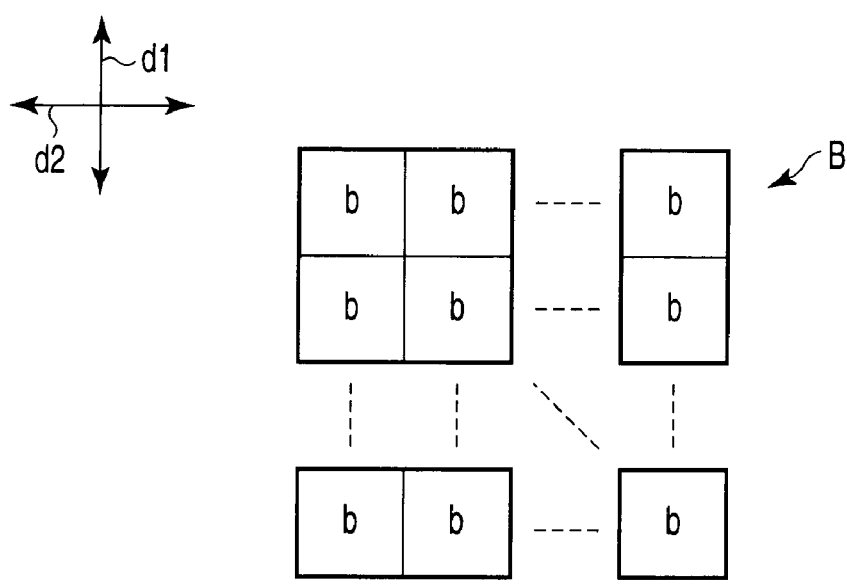
FIG. 16 is a plan view showing one of the second-pixel groups.

As FIG. 16 shows, each second-pixel group B has a plurality of second pixels b of the type shown in FIGS. 9 and 10. The second pixels b are arranged such that each is adjacent to another.

The control unit 4 switches the operating mode to the broad viewing-angle display mode or the narrow viewing-angle display mode. In the broad viewing-angle display mode, the drive voltage is so adjusted that the first liquid crystal molecules 30a and second liquid crystal molecules 30b tilt from the normal to the above-mentioned plane. Therefore, the molecules 30a are oriented in one direction and the molecules 30b are oriented in another direction, more precisely in the opposite direction, whereby an image is displayed. In the narrow viewing-angle display mode, the drive voltage is so adjusted that the liquid crystal molecules of first-pixel groups A and liquid crystal molecules of second-pixel groups B tilt from the normal to the above-mentioned plane. Therefore, the liquid crystal molecules of first-pixel groups A are oriented in one direction and the liquid crystal molecules of second-pixel groups B are oriented in another direction, whereby an image is displayed, which can be viewed from the front of the display screen.

If the control unit 4 switches the operating mode to the narrow viewing-angle display mode, the first liquid crystal molecules 30a of the first-pixel groups A and the second liquid crystal molecules 30b of the second-pixel groups B tilt from the normal to the above-mentioned plane. More specifically, the first liquid crystal molecules 30a are oriented in one direction, and the second liquid crystal molecules 30b are oriented in the opposite direction. The liquid crystal molecules 30b of the first-pixel groups A and the liquid crystal molecules 30a of the second-pixel groups B are oriented in one direction (along the normal to the above-mentioned plane).

The liquid crystal display is thus switched to the narrow viewing-angle display mode. The first-pixel groups A and the second-pixel groups B present a checkerboard pattern, in a direction inclined from the formal to the above-mentioned plane. In the direction inclining from the formal to the above-mentioned plane, the first-pixel groups A or the second-pixel groups B present an image, while the other pixel groups appear black.

That is, as shown in FIG. 13, an image, or a checkerboard pattern, is seen at viewpoints v1 and v2, and a color image is seen at viewpoint v3. At viewpoint v1, the first-pixel groups A appear black and a color image defined by the second-pixel groups B is seen. At viewpoint v2, a color image defined by the first-pixel groups A is seen and the second-pixel groups B appear black.

In the present embodiment, the first-pixel groups A and second-pixel groups B present an image at a spatial frequency low enough to provide such a contrast that the image may be recognized as a checker board pattern. Hence, if the first-pixel groups A and second-pixel groups B are adjusted in size by, for example, changing the number of first pixels a of each first-pixel group A and the number of second pixels b of each second-pixel group B, it is possible to prevent the color image from being recognized at viewpoint v1 or v2. That is, an image can be displayed that can only be recognized if viewed from the front of the display screen.

Figure 28:
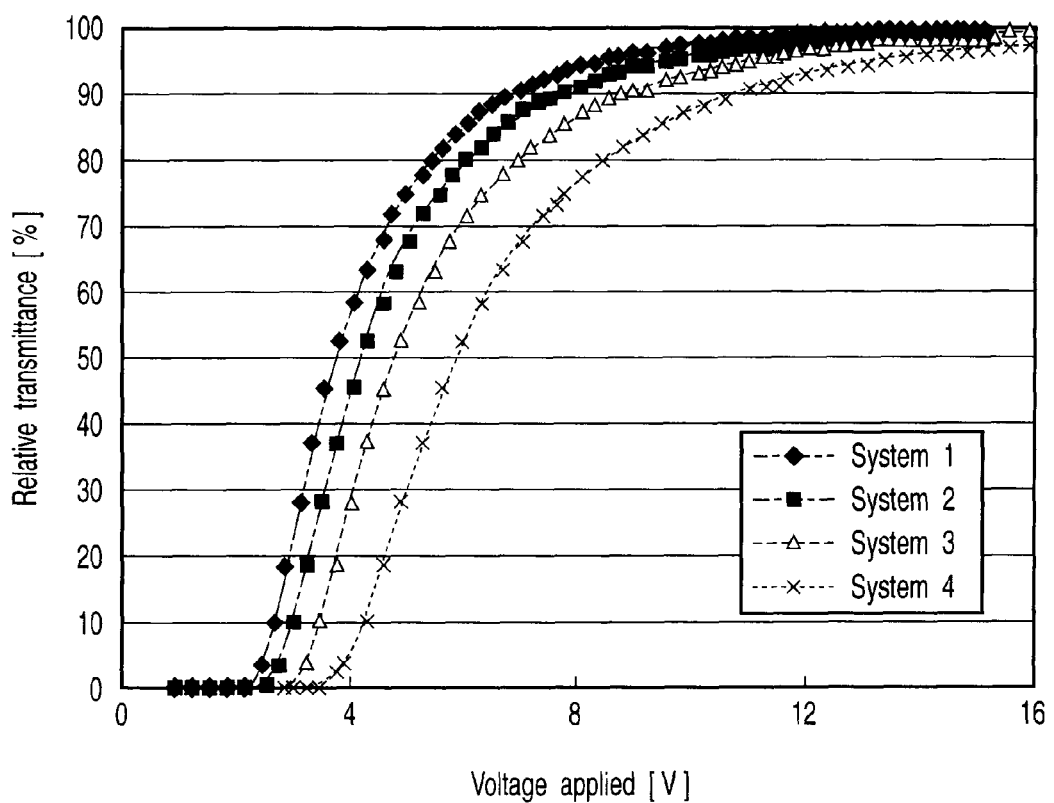
FIG. 28 is a graph showing how the relative transmittance changes with the applied voltage in Systems 1 to 4 that are shown in FIG. 27.

The inventor hereof conducted a research to determine the voltage-transmittance characteristic that the liquid crystal display exhibits with respect to viewpoint v2 (left-45° view field), viewpoint v1 (right-45° view field) and viewpoint v3 (front) when it operates in the narrow viewing-angle display to display a checker-board pattern that inclines from the normal to the above-mentioned plane. The results of the research showed that, as shown in FIGS. 27 and 28, the liquid crystal display exhibited such two voltage-transmittance characteristics with respect to viewpoints v2 (left-45° view field) by the first pixel part 53 and v1 (right-45° view field) by the second pixel part 54, respectively, as specified in the column "System 1". With respect to viewpoint v3 (front) by the second pixel part 54, the liquid crystal display exhibited a voltage-transmittance characteristics as specified in the column "System 4".

The inventor conducted another research to determine some other characteristics of the liquid crystal display according to the first embodiment. The results were as shown in FIG. 32. In Comparative Example 1, in which mosaic cells are used to display a checkerboard pattern, the pitch of the mosaic cells is fixed. In the liquid crystal display according to this embodiment, the control unit 4 can perform control to change the size of the checkerboard pattern (i.e., pitch of the mosaic cells).

The liquid crystal display can achieve the advantages specified above even if it is of the semi-transmissive type. Comparative Example 2 is an ordinary liquid crystal display that does not display checkerboard-pattern images. The liquid crystal display according to this embodiment can be manufactured without performing any steps additional to the method of manufacturing Comparative Example 2. Further, the liquid crystal display can be as thin as Comparative Example 2. Nor does it have any components additional to those of Comparative Example 2.

In the liquid crystal display so configured as described above, the liquid crystal display panel 1 has a plurality of pixels 51. Each pixel 51 has sub-pixels 52R, 52G and 52B. The sub-pixels 52R, 52G and 52B have first and second pixel parts 53 and 54 each. The first pixel part 53 and second pixel part 54 of each sub-pixel are independently driven by the control unit 4. The control unit 4 can therefore orient the first liquid crystal molecules 30a and the second liquid crystal molecules 30b independently of each other.

Therefore, in the narrow viewing-angle display mode, the liquid crystal display can display an image in the rightward direction only or the leftward direction only, and can display images in the frontal direction, and in the leftward and rightward directions in the broad viewing-angle display mode. The liquid crystal display can display an image only in the direction that is to be display. Moreover, it can display a checkerboard-pattern image in the leftward and rightward directions in the narrow viewing-angle display mode. The checkerboard-pattern image can be changed in size, and two images displayed in the leftward and rightward directions of the display screen, respectively, can be displayed such that the information they present cannot be recognized. In this case, the information of the image can be recognized only if viewed from the front of the display screen. Thus, the display characteristics of the liquid crystal display can be controlled.

It is sufficient for the liquid crystal display to display an image in the leftward and rightward directions such that the information of the image may not be recognized, and to display an image such that the information of the image may be recognized only if viewed from the front of the display screen. In the leftward and rightward directions, an image of any pattern other than the checkerboard pattern may be displayed. The liquid crystal display can display images of the various types described above, by changing the first first-pixel groups A and second-pixel groups B in size and arrangement.

The image-displaying characteristics of the liquid crystal display can be controlled without necessity of using a viewing-angle controlling liquid crystal panel. This helps to suppress the increase in the thickness and weight of the liquid crystal display. Furthermore, the increase in the manufacturing cost of the display can be suppressed, ultimately reducing the rise in the price of the liquid crystal display.

A liquid crystal display according to a second embodiment of this invention will be described in detail. The second embodiment is similar in configuration to the first embodiment described above. Therefore, the components identical to those of the first embodiment are designated by the same reference numerals and will not be described in detail.

The liquid crystal display according to the second embodiment can operate in the broad viewing-angle display mode and the stereoscopic display mode.

As shown in FIG. 27, the liquid crystal layer 30 has a $\Delta n$ value of 0.090, gap d of 3.47 μm, and $\Delta n d$ value of 313 nm.

Figure 17:
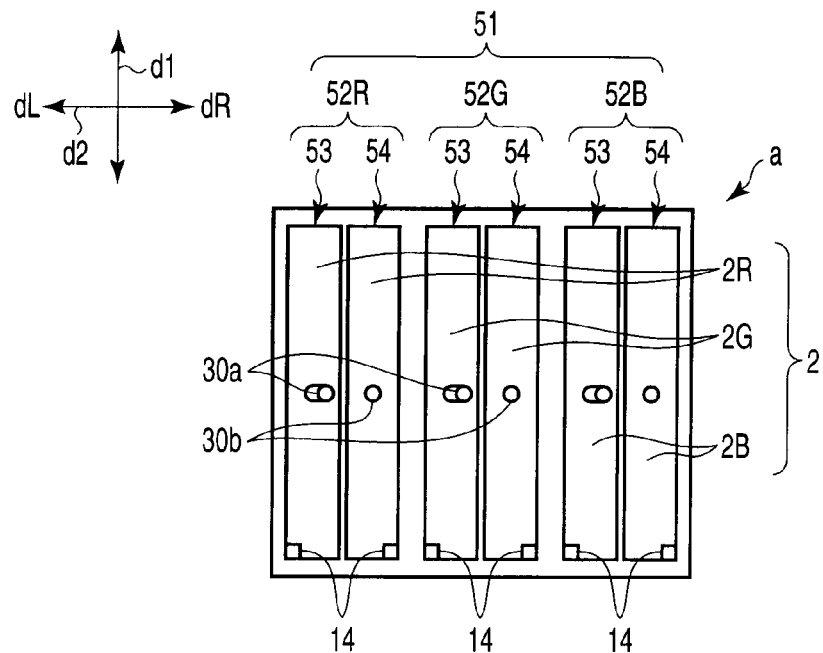
FIG. 17 is a magnified plan view of one of the pixels provided in a liquid crystal display according to a second embodiment of the invention, illustrating how the liquid crystal molecules are oriented while the first pixel parts are receiving a drive voltage and the second pixel parts are receiving no drive voltage.
Figure 18:
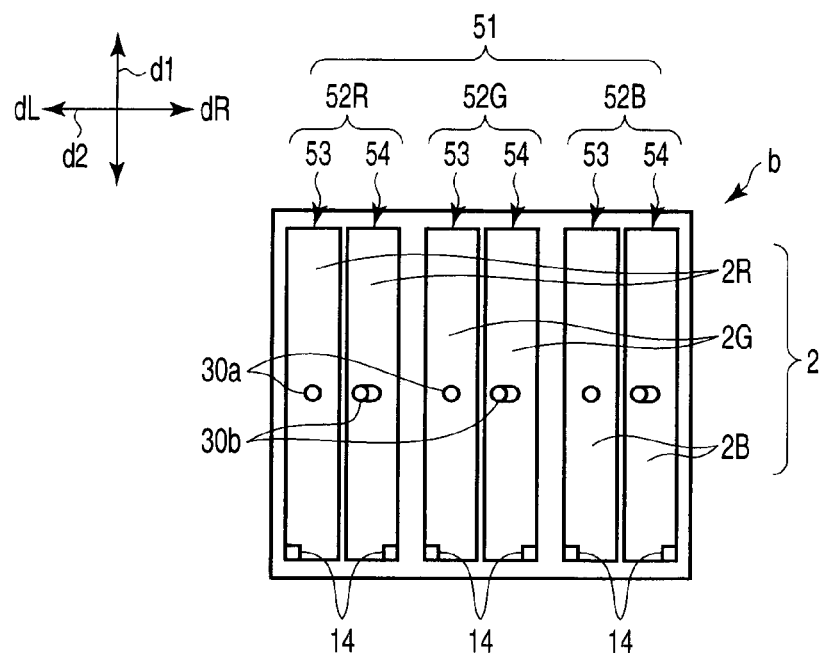
FIG. 18 is, like FIG. 17, a magnified plan view of one of the pixels provided in the liquid crystal display according to the second embodiment of the invention, illustrating how the liquid crystal molecules are oriented while the first pixel parts are receiving no drive voltage and the second pixel parts are receiving a drive voltage.
Figure 19:
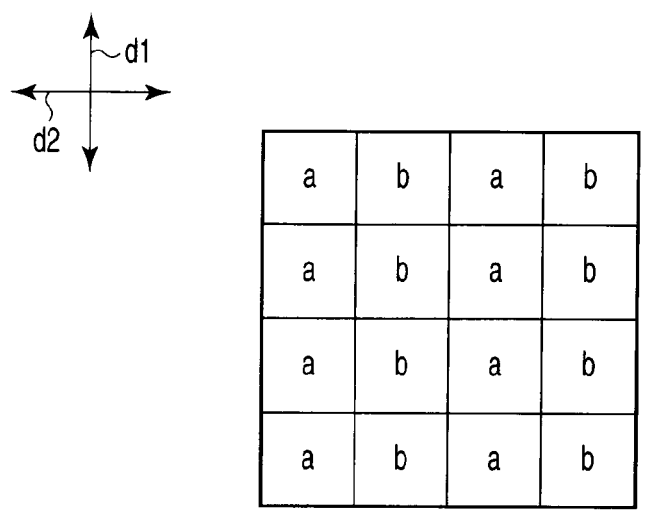
FIG. 19 is a plan view showing the first pixels and second pixels shown in FIGS. 17 and 18, which are arranged in a checkerboard pattern.
Figure 20:
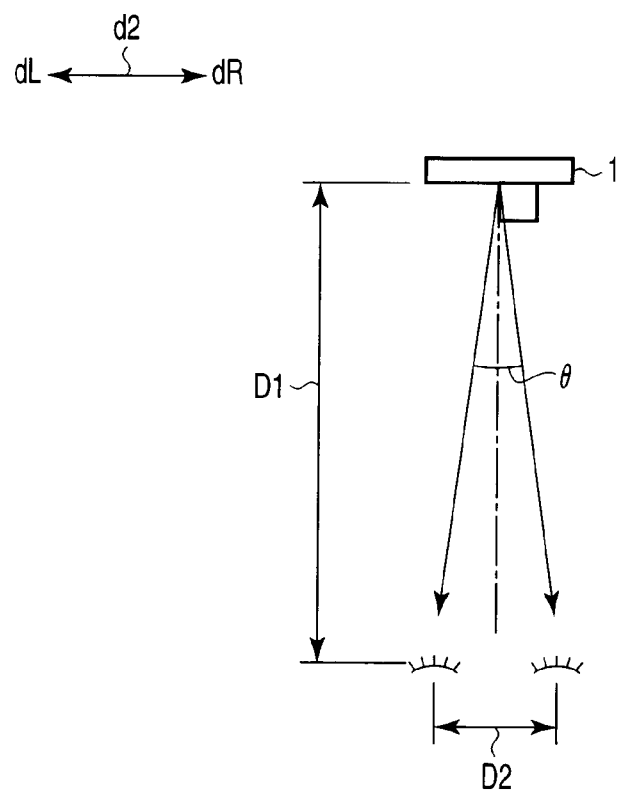
FIG. 20 is a diagram showing the path in which light travels from the liquid crystal display according to the second embodiment.
Figure 25:
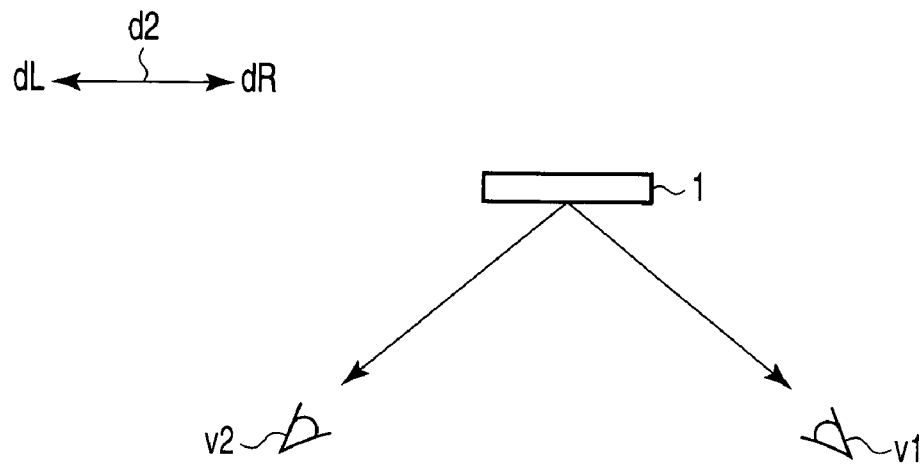
FIG. 25 is a diagram showing the path in which light travels from the liquid crystal display according to the third embodiment.

As shown in FIGS. 17, 18 and 19, some of the pixels 51 are first pixels a and the remaining pixels 51 are second pixels b. In order to display a stereoscopic image, a drive voltage is applied to the first pixel parts 53 of each first pixel a and the second pixel parts 54 of each second pixel b.

In the second embodiment, the first pixels a and the second pixels b are arranged to form a pattern of strips. The first pixels a are arranged in the first direction d1, forming columns, and the second pixels b are arranged in first direction d1, too, forming columns, and each of the first pixels a and each of the second pixels b are alternately arranged in the second direction d2, forming rows. Alternatively, the first pixels a are arranged in the first direction d1, forming columns, and the second pixels b are arranged in the first direction d1, too, forming columns, and the first pixels a and second pixels b are alternately arranged in the second direction d2, forming rows. As another alternative, the first pixels a and the second pixels b may be arranged to form a checkerboard pattern. In this case, each square of the checkerboard pattern may be defined by one pixel or pixels.

The control unit 4 switches the operating mode to the broad viewing-angle display mode or the stereoscopic display mode. In the broad viewing-angle display mode, the drive voltage is so adjusted that the first liquid crystal molecules 30a and second liquid crystal molecules 30b tilt from the normal to the above-mentioned plane and in different directions. Therefore, the molecules 30a are oriented in one direction, and the molecules 30b are oriented in another direction, more precisely in the opposite direction, whereby an image is displayed. In the stereoscopic display mode, the drive voltage is so adjusted that the first liquid crystal molecules 30a of the first pixels a and second liquid crystal molecules 30b of the second pixels b tilt from the normal to the above-mentioned plane. Therefore, the molecules 30a are oriented in one direction and the molecules 30b are oriented in another direction, more precisely in the opposite direction. The second liquid crystal molecules 30b of the first pixels a and the first liquid crystal molecules 30a of the second pixels b are oriented in a certain direction (along the normal to the above-mentioned plane), thus displaying a stereoscopic image.

If the display is switched to the stereoscopic display mode, the first liquid crystal molecules 30a of each first pixel a are oriented in the rightward direction dR from the normal to the above-mentioned plane, and the second liquid crystal molecules 30b of each second pixel b are oriented in the leftward direction dL from the normal to the above-mentioned plane.

If the control unit 4 switches the operating mode of the display to the stereoscopic display mode, the first liquid crystal molecules 30a of each first pixel a and the second liquid crystal molecules 30b of each second pixel b have a larger tilt angle than in the broad viewing-angle display mode. Note that these liquid crystal molecules acquire a specific tilt angle when the control unit 4 adjusts the drive voltage applied to the pixels.

Once the operating mode of the display has been switched to the stereoscopic display mode, the first pixels a form an image that can be seen with the left eye (one one) but not with the right eye (the other eye), and the second pixels b form an image that can be seen with the right (one one), but not with the left eye (the other eye), as can be understood from FIGS. 17 to 20.

Assume that the display screen is at a distance D1 of about 30 cm from the viewer's eyes. Then, to display a stereoscopic image, angle θ is about 14° because the distance D2 between the left and right eyes is approximately 7 cm. Hence, the liquid crystal display can display two images in directions that differ by 14° from each other, whereby a stereoscopic image is displayed. This stereoscopic image can be seen from the front of the display screen. The resolution of the stereoscopic image is half the resolution of an image displayed in the broad viewing-angle display mode.

In the present embodiment, the first pixels a and second pixels b form an image at a spatial frequency equal to or lower than the value providing such contrast sensitivity that the image may not be recognized as a strip pattern.

The first pixels a and second pixels b may form a checkerboard pattern. In this case, the pixels a and b need only form an image at such a spatial frequency providing contrast sensitivity at which the image may not be recognized as a checkerboard pattern.

The inventors hereof conducted a research to determine the voltage-transmittance characteristic that the liquid crystal display exhibits in the left-7° view field, the right-7° view field and the front when it displays a stereoscopic image. As a result, the voltage-transmittance characteristic the first pixel parts 53 of each first pixel a exhibited for the left-7° view field and the voltage-transmittance characteristic the second pixel parts 54 of each second pixel b for the right-7° view field were as shown in the column "System 1" of FIG. 27 and as seen from FIG. 28. For the front of the first pixel parts 53 of each first pixel a and the front of the second pixel parts 54 of each second pixel b, the voltage-transmittance characteristic was as specified in the column "System 2."

Assume that the control unit 4 switches the operating mode of the display to the broad viewing-angle display mode. Then, the control unit 4 adjusts the drive voltage, tilting the first liquid crystal molecules 30a in one direction and second liquid crystal molecules 30b in another direction, more precisely in the opposite direction, from the normal to the above-mentioned plane. As a result, the first pixel parts 53 and second pixel parts 54 present an image in the broad viewing-angle display mode.

In the liquid crystal display configured as described above, the liquid crystal display panel 1 has a plurality of pixels 51. Each pixel 51 has sub-pixels 52R, 52G and 52B. Each of the sub-pixels 52R, 52G and 52B has first pixel part 53 and second pixel part 54. The first pixel part 53 and second pixel part 54 of each sub-pixel are driven independently of each other by the control unit 4. The control unit 4 can therefore orient the first liquid crystal molecules 30a and the second liquid crystal molecules 30b independently of each other.

Therefore, the liquid crystal display can display an image that can be seen from the front, the leftward direction and the rightward direction of the display screen, in the broad viewing-angle display mode, and can display a stereoscopic image that can be seen from the front of the display screen in the stereoscopic display mode. Thus, the liquid crystal display can be controlled in terms of display characteristics.

The image-displaying characteristics of the liquid crystal display can therefore be controlled without the necessity of using a viewing-angle controlling liquid crystal panel. This helps to suppress an increase in the thickness and weight of the liquid crystal display. Furthermore, an increase in the manufacturing cost of the display can be suppressed, ultimately reducing the rise in the price of the liquid crystal display.

A liquid crystal display according to a third embodiment of the invention will be described in detail. The third embodiment is similar in configuration to the first and second embodiments described above. Therefore, the components identical to those of the first and second embodiment are designated by the same reference numerals and will not be described in detail.

The liquid crystal display according to the third embodiment can operate in the broad viewing-angle display mode and the two-screen display mode. The display can operate in the two-screen display mode only if the liquid crystal molecules are tilted by a smaller angle than in the case where the second embodiment operates in the stereoscopic display mode.

As shown in FIG. 27, the liquid crystal layer 30 has a Δn value of 0.077, gap d of 3.50 μm, and Δnd value of 271 nm.

As shown in FIGS. 22, 23 and 24, some of the pixels 51 are first pixels a and the remaining pixels 51 are second pixels b. The first pixel a, in which the drive voltage is applied to the first pixel part 53 only, and the second pixel b, in which the drive voltage is applied to the second pixel part 54 only, are used in order to display images on two display screens.

In the third embodiment, the first pixels a and the second pixels b are arranged to form a pattern of strips. The first pixels a are arranged in the first direction d1, forming columns, and the second pixels b are arranged in first direction d1, too, forming columns, and each of the first pixels a and each of the second pixels b are alternately arranged in the second direction d2, forming rows. Alternatively, the first pixels a are arranged in the first direction d1, forming columns, and the second pixels b are arranged in the first direction d1, too, forming columns, and the first pixels a and second pixels b are alternately arranged in the second direction d2, forming rows. Further, the first pixels a and the second pixels b may be arranged to form a checkerboard pattern. In this case, each square of the checkerboard pattern may be defined by one pixel or pixels.

The control unit 4 switches the operating mode to the broad viewing-angle display mode or the two-screen display mode. In the broad viewing-angle display mode, the drive voltage is so adjusted that the first liquid crystal molecules 30a and second liquid crystal molecules 30b tilt from the normal to the above-mentioned plane and in different directions. Therefore, the molecules 30a are oriented in one direction, and the molecules 30b are oriented in another direction, more precisely in the opposite direction, whereby an image is displayed. In the stereoscopic display mode, the drive voltage is so adjusted that the first liquid crystal molecules 30a of the first pixels a and second liquid crystal molecules 30b of the second pixels b tilt from the normal to the above-mentioned plane. Therefore, the molecules 30a are oriented in one direction and the molecules 30b are oriented in another direction, more precisely in the opposite direction. The second liquid crystal molecules 30b of the first pixels a and the first liquid crystal molecules 30a of the second pixels b are oriented in a certain direction (along the normal to the above-mentioned plane), thus displaying images.

If the display is switched to the two-screen display mode, the first liquid crystal molecules 30a of each first pixel a are oriented in the rightward direction dR from the normal to the above-mentioned plane, and the second liquid crystal molecules 30b of each second pixel b are oriented in the leftward direction dL from the normal to the above-mentioned plane.

Once the operating mode has been switched to the two-screen display mode, the first liquid crystal molecules 30a of each first pixel a and the second liquid crystal molecules 30b of each second pixel b have a smaller tilt angle than in the stereoscopic display mode. Note that these liquid crystal molecules acquire a specific tilt angle when the control unit 4 adjusts the drive voltage applied to the pixels.

Once the control unit 4 switches the operating mode to the two-screen display mode, the first pixels a form a first image that can be seen as viewed in a direction inclined from the normal to the display screen (that is, from viewpoint v2), and the second pixels b form a second image that can be seen as viewed in another direction inclined from the normal (that is, from viewpoint v1), as can be understood from FIGS. 22 to 25. Hence, the liquid crystal display can display, in the two-screen display mode, two images that can be seen as viewed in different directions. The resolution of the two-screen mode is half the resolution of an image displayed in the broad viewing-angle display mode.

In the present embodiment, the first pixels a and second pixels b form an image at a spatial frequency equal to or lower than the value providing such contrast sensitivity that the image may not be recognized as a strip pattern. Images can therefore be displayed on two screens. The first pixels a and second pixels b may form a checkerboard pattern. In this case, the pixels a and b need only form an image at such a spatial frequency providing contrast sensitivity at which the image may not be recognized as a checkerboard pattern.

The inventor hereof conducted a research to determine the voltage-transmittance characteristic that the liquid crystal display exhibits in the left-30° view field, the right-30° view field and the front when it operates in the two-screen display mode. The voltage-transmittance characteristic the first pixel parts 53 of each first pixel a exhibited for the left-30° view field, and the voltage-transmittance characteristic the second pixel parts 54 of each second pixel b exhibited for the right-30° view field were as shown in the column "System 1" of FIG. 27 and as seen from FIG. 28. For the front of the first pixel parts 53 of each first pixel a and the front of the second pixel parts 54 of each second pixel b, the voltage-transmittance characteristics were as specified in the column "System 3."

Figure 26:
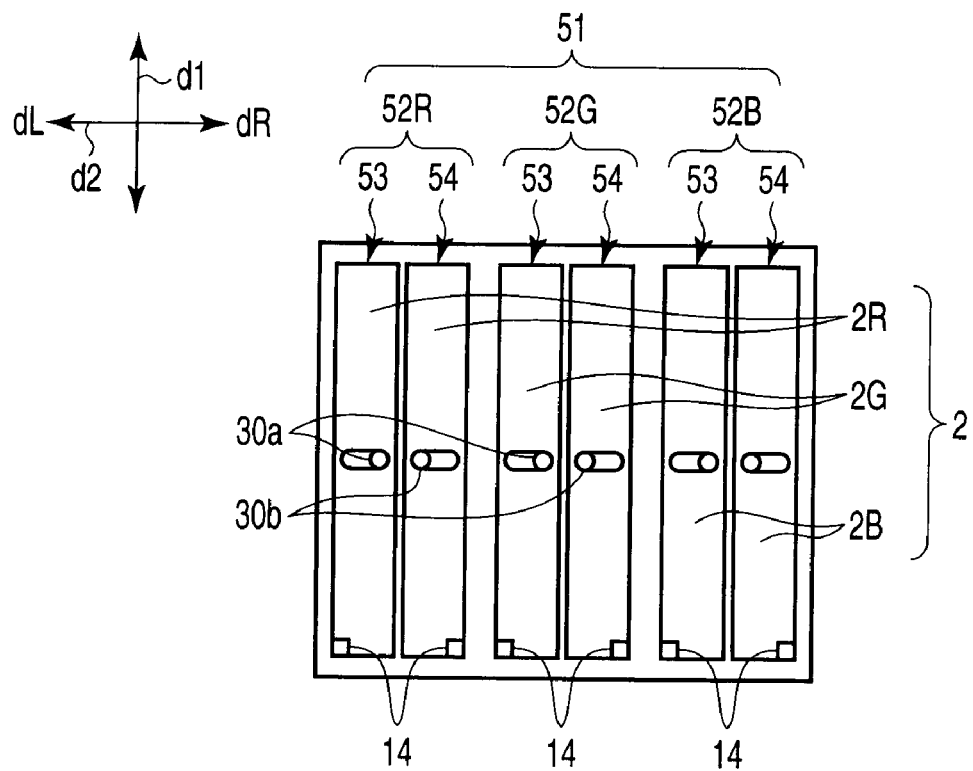
FIG. 26 is, like FIGS. 22 and 23, a magnified plan view of one of the pixels provided in the liquid crystal display according to the third embodiment of the invention, illustrating how the liquid crystal molecules are oriented while the first and second pixel parts are receiving a drive voltage.

Once the control unit 4 has switched the operating mode of the display to the broad viewing-angle display mode, it adjusts the drive voltage, tilting the first liquid crystal molecules 30a and the second liquid crystal molecules 30b from the normal to the above-mentioned plane, as shown in FIG. 26. As a result, the first liquid crystal molecules 30a are oriented in one direction, and the second liquid crystal molecules 30b are oriented in another direction, more precisely in the opposite direction. The first pixel parts 53 and second pixel parts 54 thus present an image. Thus, the liquid crystal display operates in the broad viewing-angle display mode.

In the liquid crystal display configured as described above, the liquid crystal display panel 1 has a plurality of pixels 51. Each pixel 51 has sub-pixels 52R, 52G and 52B. Each of the sub-pixels 52R, 52G and 52B has first pixel part 53 and second pixel part 54. The first pixel part 53 and second pixel part 54 of each sub-pixel are driven independently of each other by the control unit 4. The control unit 4 can therefore orient the first liquid crystal molecules 30a and the second liquid crystal molecules 30b independently.

Therefore, the liquid crystal display can display an image that can be seen from the front, the leftward direction and rightward direction of the display screen in the broad viewing-angle display mode, and can display two images that can be seen in the leftward and rightward direction on the display screen in the two-screen display mode. Thus, the liquid crystal display can be controlled in terms of display characteristics.

The image-displaying characteristics of the liquid crystal display can therefore be controlled without necessity of using a viewing-angle controlling liquid crystal panel. This helps to suppress an increase in the thickness and weight of the liquid crystal display. Furthermore, an increase in the manufacturing cost of the display can be suppressed, ultimately reducing the rise in the price of the liquid crystal display.

A liquid crystal display according to a fourth embodiment of this invention will be described in detail. The fourth embodiment is similar in configuration to the first embodiment described above. Therefore, the components identical to those of the first to third embodiment are designated by the same reference numerals and will not be described in detail.

The liquid crystal display according to the fourth embodiment can operate in the broad viewing-angle display mode and the narrow viewing-angle display mode. In the narrow viewing-angle display mode, the liquid crystal display displays an image that cannot be recognized as viewed in a direction inclined from the normal to the display screen and can be seen as viewed from the front of the display screen.

Figure 29:
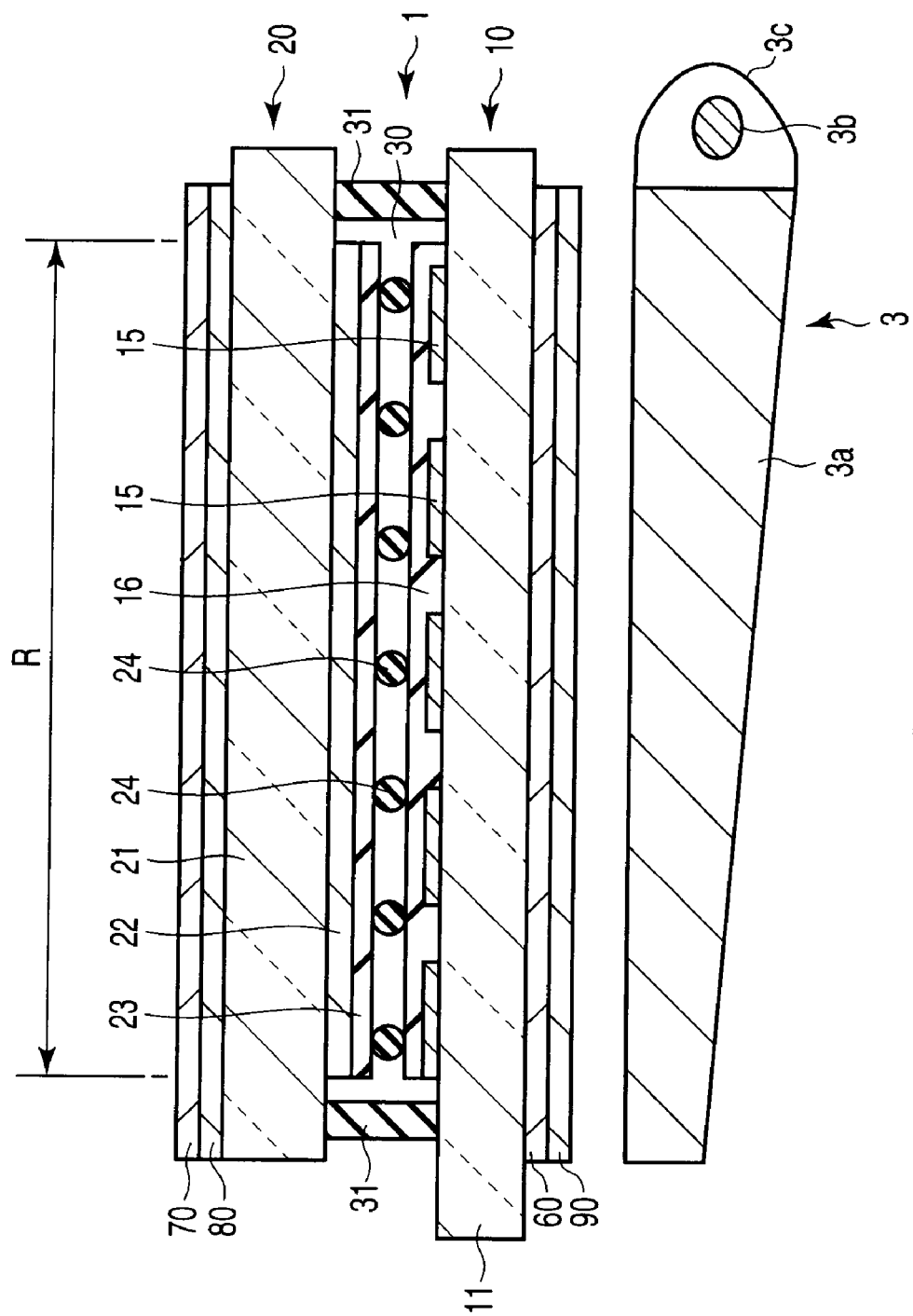
FIG. 29 is a sectional view of a liquid crystal display according to a fourth embodiment of the present invention.
Figure 30:
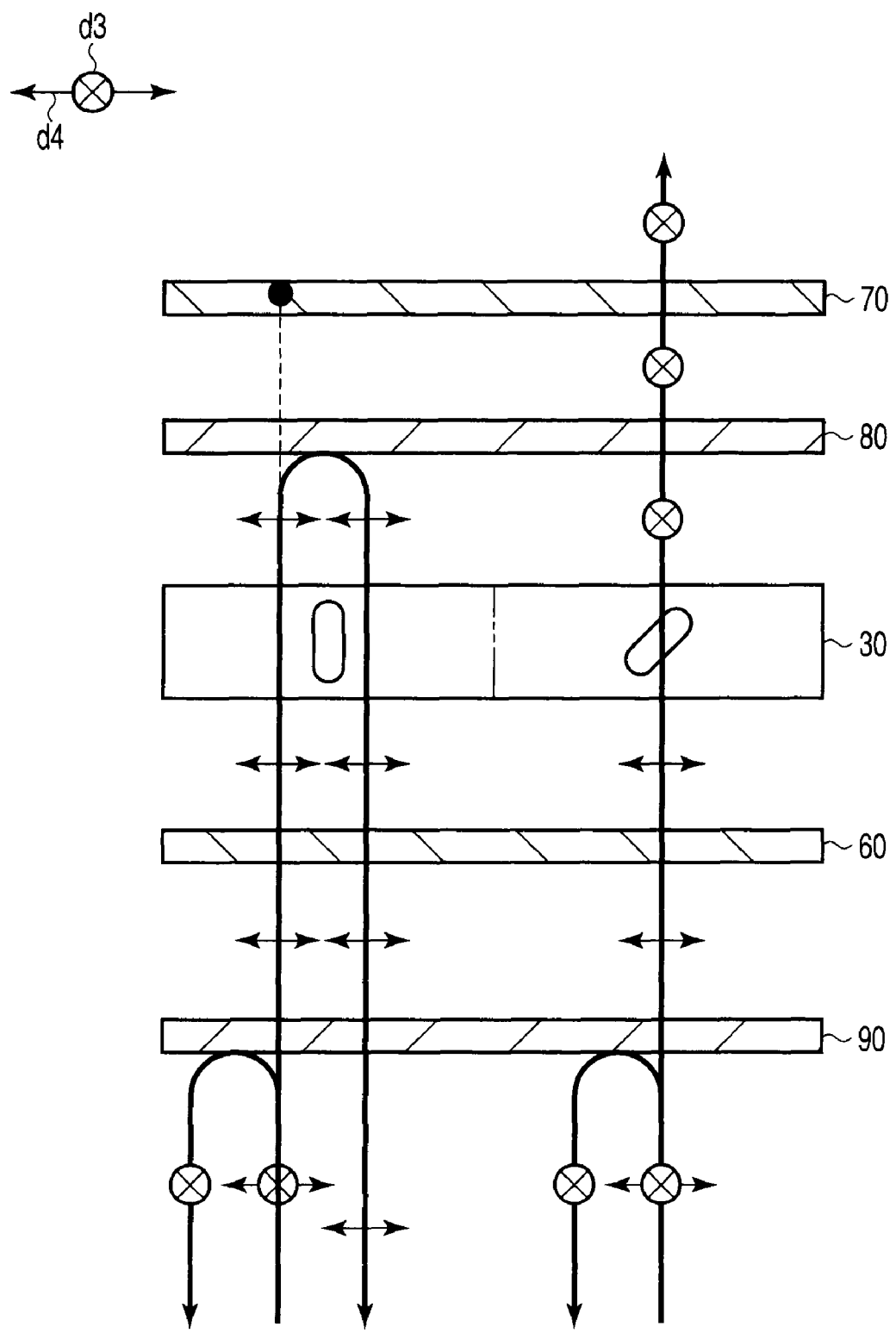
FIG. 30 is a diagram explaining the optical characteristics that the liquid crystal display according to the fourth embodiment has and the path in which light travels in this liquid crystal display.

As shown in FIGS. 29 and 30, the liquid crystal panel 1 comprises a first polarizing reflector 80 and a second polarizing reflector 90, in addition to the components mentioned above. The first polarizing reflector 80 is interposed between the glass substrate 21 and the second polarizing plate 70. The second polarizing reflector 90 is interposed between the backlight unit 3 and the first polarizing plate 60.

In the fourth embodiment, the second polarizing reflector 90 is a linear-polarizing reflector that reflects a linearly polarized beam parallel to the absorption axis of the first polarizing plate 60 and has a reflection axis parallel to the third direction d3. The first polarizing reflector 80 is a linear-polarizing reflector that reflects a linearly polarized beam parallel to the absorption axis of the second polarizing plate 70 and has a reflection axis parallel to the fourth direction d4.

The optical characteristics the liquid crystal display exhibits while the molecules of the liquid crystal layer 30 remain oriented along the normal to the above-mentioned plane (that is, while no electric field is being applied to the liquid crystal layer 30) will next be explained, together with the path in which the light emitted from the backlight unit 3 travels.

As FIG. 30 shows, the second polarizing reflector 90 partly allows passage of the diffusing light emitted from the backlight unit 3 and partly reflects this diffusing light. That is, the second polarizing reflector 90 guides a linearly polarized beam traveling in the fourth direction d4 to the first polarizing plate 60 and reflects a linearly polarized beam traveling in the third direction d3, back to the backlight unit 3. This beam is reflected in the backlight unit 3 and is emitted again from the backlight unit 3. The second polarizing reflector 90 therefore serves to increase the luminance of the liquid crystal display.

The first polarizing plate 60 and the liquid crystal layer 30 maintain the incident light in a polarized state and guide the linearly polarized beam traveling in the fourth direction d4 to the first polarizing reflector 80. Since the beam traveling in the fourth direction d4 is parallel to the reflection axis of the first polarizing reflector 80, it is reflected by the first polarizing reflector 80. Thus, the first polarizing reflector 80 can shield the light coming from the liquid crystal layer 30.

The optical characteristics the liquid crystal display exhibits while the molecules of the liquid crystal layer 30 remain oriented in a direction inclined from the normal to the above-mentioned plane (that is, while an electric field is being applied to the liquid crystal layer 30) will next be explained, together with the path in which the light emitted from the backlight unit 3 travels.

As FIG. 30 shows, the second polarizing reflector 90 partly allows passage of the diffusing light emitted from the backlight unit 3 and partly reflects this diffusing light. That is, the second polarizing reflector 90 guides a linearly polarized beam traveling in the fourth direction d4 to the first polarizing plate 60 and reflects a linearly polarized beam traveling in the third direction d3, back to the backlight unit 3. The first polarizing plate 60 polarizes the beam in the fourth direction d4. The light thus polarized is applied as a beam linearly polarized in the fourth direction d4 to the liquid crystal layer 30.

The liquid crystal layer 30 rotates the beam, which is linearly polarized in the fourth direction d4, by 90° to the third direction d3. The beam thus rotated and linearly polarized in the third direction d3 is emitted to the first polarizing reflector 80. The beam linearly polarized in the third direction d3 intersects at right angles with the reflection axis of the first polarizing reflector 80 and with the absorption axis of the second polarizing plate 70. Therefore, this beam passes through the first polarizing reflector 80 and the second polarizing plate 70.

To determine the various characteristic of the liquid crystal display according to the fourth embodiment, the inventor conducted a research. In the research, the second polarizing reflector 90 was not used because the display achieves the same advantage whether the reflector 90 is used or not. To determine the various characteristics of a liquid crystal display that has neither the first polarizing reflector 80 nor the second polarizing reflector 90, the inventor conducted another research.

Figure 31:
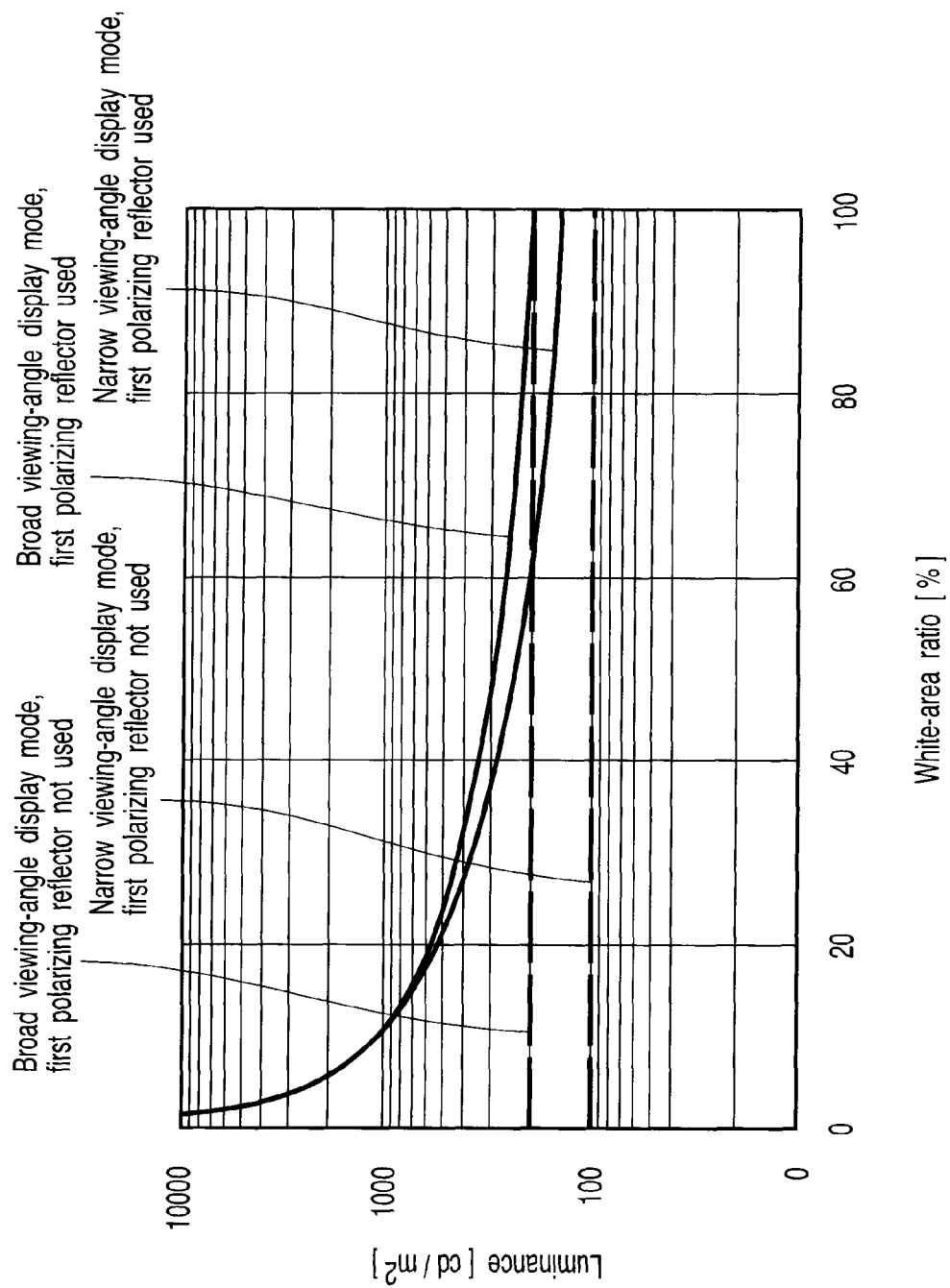
FIG. 31 is a graph representing how the luminance changes with the white-area ratio in a liquid crystal display having a first polarizing reflector and in a liquid crystal display having no first polarizing reflector.

The results of these researches were as shown in FIG. 31. As seen from FIG. 31, the first polarizing reflector 80 increases the luminance level. Note that the data shown in FIG. 31 are the characteristics the display without the second polarizing reflector 90 exhibited when operated in the broad viewing-angle display mode, achieving a front luminance of 200 cd/m².

Further, the inventor determined the various characteristics of a liquid crystal display without the second polarizing reflector 90. The results were as shown in FIG. 32. As can be understood from FIG. 32, the results were better than those concerning the first embodiment. As is evident from FIG. 31, too, the luminance level, in particular, was higher in the narrow viewing-angle display mode than in the liquid crystal display according to the first embodiment. However, the display is 0.2 mm thicker than the display according to the first embodiment, inevitably because it has the first polarizing reflector 80.

The liquid crystal display so configured as described above can attain the same advantages as the display according to the first embodiment. In addition, it can have a higher luminance level than the display according to the first embodiment. Since the efficiency of light use can be enhanced, the display can acquire a high luminance level even in the narrow viewing-angle display mode.

The present invention is not limited to the several embodiments described above. Various changes and modifications can be made without departing from the scope or spirit of the invention at the point of actualizing the invention. Further, the components of any embodiment described above may be combined, if necessary, in various ways to make different inventions. For example, some of the components of any embodiment may not be used. Moreover, the components of the embodiments may be combined in any desired fashion.

For example, the first polarizing reflector 80 and second polarizing reflector 90 may be each a linear-polarizing reflector that comprises a plurality of isotropic medium layers and a plurality of anisotropic medium layers. If this is the case, the isotropic medium layers and the anisotropic medium layers are alternately laid, one on another.

If the light that travels through the liquid crystal layer 30 is a circularly polarized beam, the first liquid crystal molecules 30a and the second liquid crystal molecules 30b only need to twist in the opposite directions, i.e., clockwise and counter-clockwise. In this case, the first polarizing reflector 80 has a circularly-polarized light reflecting layer and a quarter-wave plate that is arranged opposite to the circularly-polarizing reflector. The circularly-polarizing reflector may be made, for example, of a liquid crystal whose molecules are twisted or by polymerizing such a liquid crystal.

The display region R may consist of a plurality of sub-regions. If this is the case, the control unit 4 needs only to switch the display state in a region that overlaps at least one of the sub-regions.

Moreover, the first pixel parts 54 and the second pixel parts 54 need only be provided in the same number.

Liquid crystal displays according to the present invention are not limited to the color display type that has a color filter 2. They may be of the monochrome display type that has no color filters. In the monochrome display type, each pixel 51 has a first pixel part 53 and a second pixel part 54, each including a TFT 14 and a pixel electrode 15 electrically connected to the TFT 14. The control unit orients the first liquid crystal molecules 30a lying on the first pixel part 53, independently of the second liquid crystal molecules 30b lying on the second pixel part 54.

Further, liquid crystal displays according to the present invention are not limited to the transmissive type. For example, they may be of the semi-transmissive type.

What is claimed is:
1. A liquid crystal display apparatus, comprising:
a first substrate;
a second substrate arranged opposite to the first substrate with a gap;
a liquid crystal layer held between the first substrate and the second substrate; and
a plurality of pixels provided between the first substrate and the second substrate, each comprising a plurality of sub-pixels of different colors and being the smallest display element capable of appearing white,
wherein each sub-pixel has a first pixel part including a switching element and a pixel electrode electrically connected to the switching element, and a second pixel part including a switching element and a pixel electrode electrically connected to the switching element; and first liquid crystal molecules lying on the first pixel part of each sub-pixel are oriented independently of second liquid crystal molecules lying on the second pixel part of the sub-pixel;
and further comprising:
a control unit configured to apply a drive voltage to each of the switching elements and to adjust the drive voltage, thereby to switch the apparatus to a black display mode in which the first liquid crystal molecules and the second liquid crystal molecules are oriented in one direction to appear black, or to a broad viewing-angle display mode in which the first liquid crystal molecules tilt from a normal to the planes of the first and second substrates and are oriented in a certain direction, and the second liquid crystal molecules tilt from the normal and are oriented in the opposite direction, in order to display an image.

2. A liquid crystal display apparatus, comprising:

a first substrate;

a second substrate arranged opposite to the first substrate with a gap;

a liquid crystal layer held between the first substrate and the second substrate; and a plurality of pixels provided between the first substrate and the second substrate, each comprising a plurality of sub-pixels of different colors and being the smallest display element capable of appearing white, wherein each sub-pixel has a first pixel part including a switching element and a pixel electrode electrically connected to the switching element, and a second pixel part including a switching element and a pixel electrode electrically connected to the switching element; and first liquid crystal molecules lying on the first pixel part of each sub-pixel are oriented independently of second liquid crystal molecules lying on the second pixel part of the sub-pixel;

and further comprising:

a control unit configured to apply a drive voltage to each of the switching elements and to adjust the drive voltage, thereby to switch the apparatus to a broad viewing-angle display mode in which the first liquid crystal molecules tilt from a normal to the planes of the first and second substrates and are oriented in a certain direction, and the second liquid crystal molecules tilt from the normal and are oriented in the opposite direction, in order to display an image, or to a narrow viewing-angle display mode in which either the first liquid crystal molecules or the second liquid crystal molecules are oriented in one direction, while the other liquid crystal molecules are oriented in a direction inclined from the normal, thereby to display an image in a direction inclined from the normal.

3. A liquid crystal display apparatus, comprising:

a first substrate;

a second substrate arranged opposite to the first substrate with a gap;

a liquid crystal layer held between the first substrate and the second substrate; and a plurality of pixels provided between the first substrate and the second substrate, each comprising a plurality of sub-pixels of different colors and being the smallest display element capable of appearing white, wherein each sub-pixel has a first pixel part including a switching element and a pixel electrode electrically connected to the switching element, and a second pixel part including a switching element and a pixel electrode electrically connected to the switching element; and first liquid crystal molecules lying on the first pixel part of each sub-pixel are oriented independently of second liquid crystal molecules lying on the second pixel part of the sub-pixel;

and further comprising:

a control unit configured to apply a drive voltage to each switching element; and first-pixel groups and second-pixel groups, provided between the first and second substrates and arranged to form a checkerboard pattern, wherein the first-pixel groups and second-pixel groups have a plurality of pixels each; and the control unit adjusts the drive voltage, thereby switching the apparatus to a broad viewing-angle display mode in which the first liquid crystal molecules tilt from a normal to the planes of the first and second substrates and are oriented in a certain direction, and the second liquid crystal molecules tilt from the normal and are oriented in the opposite direction, in order to display an image, or to a narrow viewing-angle display mode in which the liquid crystal molecules of the first-pixel groups tilt from the normal in one direction and the liquid crystal molecules of the second-pixel groups tilt from the normal in another direction, thereby to display an image in front of the planes.

4. The liquid crystal display apparatus according to claim 3, wherein when the control unit switches the apparatus to the narrow viewing-angle display mode, the first liquid crystal molecules of the first-pixel groups tilt from the normal and are oriented in a certain direction, the second liquid crystal molecules of the second-pixel groups tilt from the normal and are oriented in another direction, and the second liquid crystal molecules of the first-pixel groups and the first liquid crystal molecules of the second-pixel groups are oriented in one direction.

5. The liquid crystal display apparatus according to claim 3, wherein when the control unit switches the apparatus to the narrow viewing-angle display mode, in a direction inclined from the formal to the planes, the first-pixel groups or the second-pixel groups display an image and the other pixel groups appear black, thereby displaying an image having a checkerboard pattern.

* * * * *